(12) United States Patent
Hussain

(10) Patent No.: US 11,509,483 B2
(45) Date of Patent: Nov. 22, 2022

(54) GENERATING ELECTRONIC SIGNATURES

(71) Applicant: Yoti Holding Limited, London (GB)

(72) Inventor: Alttaf Hussain, London (GB)

(73) Assignee: Yoti Holding Limited, London (GB)

( * ) Notice: Subject to any disclaimer, the term of this patent is extended or adjusted under 35 U.S.C. 154(b) by 0 days.

(21) Appl. No.: 17/058,539

(22) PCT Filed: May 24, 2019

(86) PCT No.: PCT/EP2019/063542
§ 371 (c)(1),
(2) Date: Nov. 24, 2020

(87) PCT Pub. No.: WO2019/224384
PCT Pub. Date: Nov. 28, 2019

(65) Prior Publication Data
US 2021/0211299 A1    Jul. 8, 2021

(30) Foreign Application Priority Data

May 25, 2018 (GB) .................................. 1808656
Jul. 26, 2018 (GB) .................................. 1812172

(51) Int. Cl.
*H04L 9/32* (2006.01)
*G06F 21/32* (2013.01)

(52) U.S. Cl.
CPC ............ *H04L 9/3247* (2013.01); *G06F 21/32* (2013.01); *H04L 9/3213* (2013.01); *H04L 9/3231* (2013.01); *H04L 9/3242* (2013.01)

(58) Field of Classification Search
None
See application file for complete search history.

(56) References Cited

U.S. PATENT DOCUMENTS

| 9,992,026 | B2 * | 6/2018 | Geoffrey | ................. | G06F 21/32 |
| 2013/0013699 | A1 * | 1/2013 | Huxley | ................... | H04L 67/14 |
| | | | | | 709/204 |
| 2016/0035053 | A1 * | 2/2016 | Gerhardt | ................. | G06F 21/64 |
| | | | | | 705/316 |

(Continued)

FOREIGN PATENT DOCUMENTS

| EP | 2890170 A1 * | 7/2015 | ........... H04L 63/083 |
| WO | WO-2015088986 A1 * | 6/2015 | ........... H04L 9/3228 |
| WO | WO 2016/173993 A1 | 11/2016 | |

OTHER PUBLICATIONS

Partial International Search Report and Provisional Opinion in PCT/EP2019/063542 dated Aug. 7, 2019.

*Primary Examiner* — Benjamin E Lanier
(74) *Attorney, Agent, or Firm* — Knobbe, Martens, Olson & Bear, LLP

(57) ABSTRACT

According to a first aspect of the present invention, there is provide a method of electronically signing content. Content to be signed and an attribute sharing item are presented at a signing device associated with a signer. It is detected that the signer has accessed the attribute sharing item to provide one or more identity attributes which uniquely identify the signer. It is also detected that the signer has initiated a signing action at the signing device. The signing action and the identity attributes are transmitted to a signing service which is configured to create an electronic signature including encrypting the content to be signed and the one or more identity attribute.

20 Claims, 32 Drawing Sheets

(56) References Cited

U.S. PATENT DOCUMENTS

2016/0239653 A1    8/2016  Loughlin-Mchugh et al.
2017/0223093 A1*   8/2017  Peterson ............... H04L 63/102
2020/0076612 A1*   3/2020  Adluri ................... G06Q 10/10

* cited by examiner

| Attribute Field | Example Value |
|---|---|
| Name | Surname |
| Type | String |
| Value | Garcia |
| Anchors | Passport, Driving License |
| Confidence | 0.3 |
| Anchor Links | [passport db handle, driving db handle] |
| Interaction Feedback List | ? |
| Timestamp | 2009-10-11-222949499494....... |

Document Cover Sheet          Powered by YOTI SIGN

*This cover sheet relates to the attached document:*

Candidate 124310 Acceptance Letter.pdf
4 pages (including this cover sheet)
*Once all parties have signed, this agreement will be legally binding.*

*Requested by:*
melissa.peterson@yoti.com

*To be signed by:*
Signee: Jake Spencer (jake.spencer@yoti.com)

Email Address
*Verified by Yoti*

Date Signed
*Verified by Yoti*

504 —

ID Photo
*To be verified by Yoti*

Full Name
*Verified by Yoti*

Candidate acceptance Letter

I hearby accept the Web-Developer role at Yoti for 40 hours a week for the London Minimum Living Wage.

Signature

Document Cover Sheet    Powered by YOTI|SIGN

*This cover sheet relates to the attached document:*

Candidate 124310 Acceptance Letter.pdf
4 pages (including this cover sheet)
*Once all parties have signed, this agreement will be legally binding.*

Requested by:
*melissa.peterson@yoti.com*

To be signed by:
Signee: Jake Spencer (jake.spencer@yoti.com)

⊘ | jake.spencer@yoti.com
Email Address
*Verified by Yoti*

⊘ | 2018-04-13T09:55:25.769z
Date Signed
*Verified by Yoti*

⊘  ~506
ID Photo
*To be verified by Yoti*

⊘ | JAKE SPENCER
Full Name
*Verified by Yoti*

FIG. 5f

Candidate acceptance letter

I hearby accept the Web-Developer role at Yoti for 40 hours a week for the London Minimum Living Wage.

✗
SIGN HERE  ~507

FIG. 5g

Candidate acceptance Letter

I hearby accept the Web-Developer role at Yoti for 40 hours a week for the London Minimum Living Wage.

—507

You're all done!

You have successfully signed and submitted:

Candidate 124310 Acceptance Letter.pdf

We will email you a completed copy once everyone has signed the document.

DONE

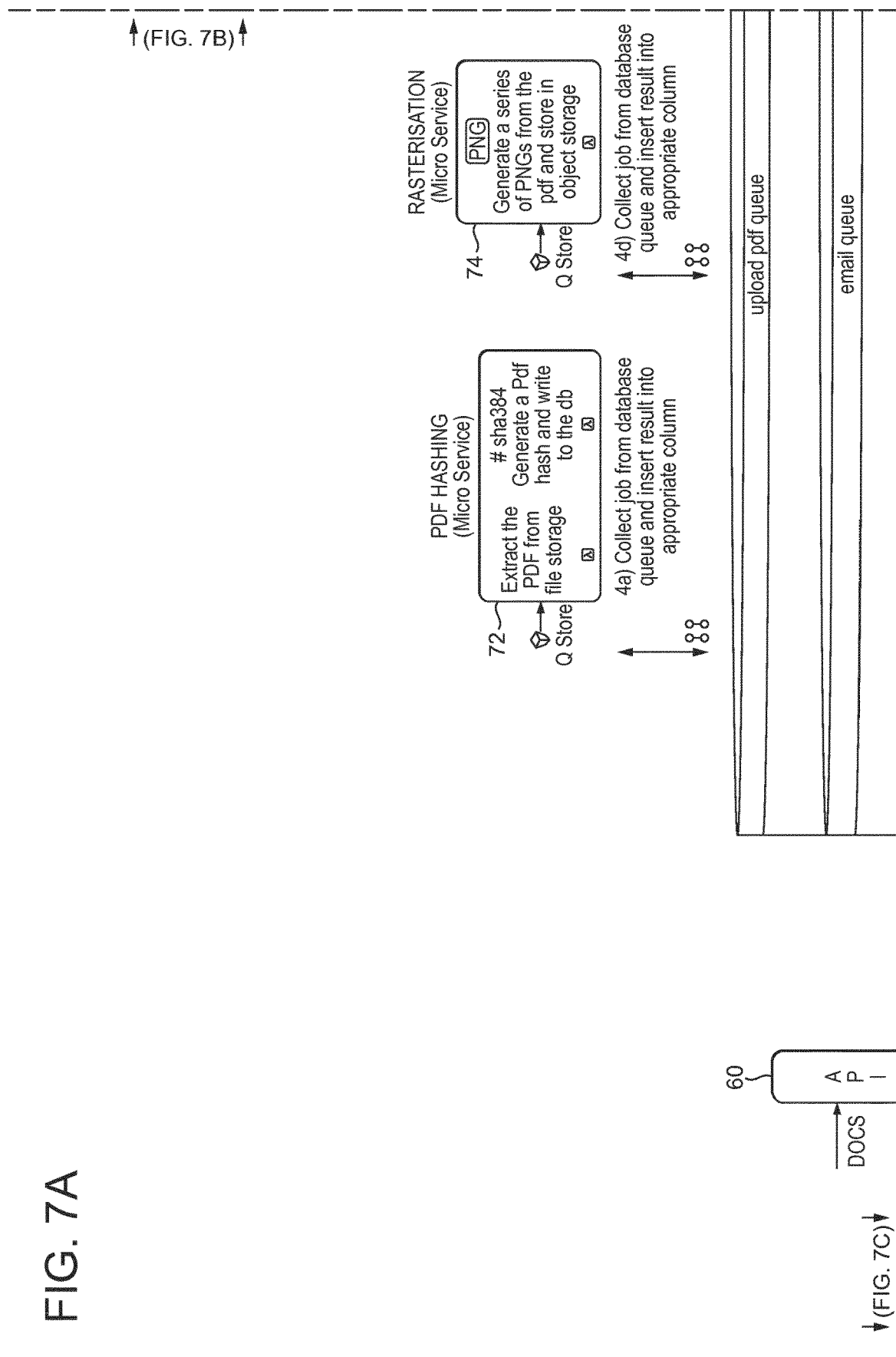

Signature ( SEALED ACTION )         From sender ( LATEST DOCUMENT HASHES )    Hashes of edited/signed PDFs ( COVER SHEET TAGS LATEST DOCUMENT )    Hashed and timestamped

XML

< SIGNED INFO >      SIGNERS KEY

[ SIGNING PROPERTIES ] — HASH 1 (#)
                                     HASH (#)
[ BODY ] — HASH 2 (#)

FIG. 10a

GENERATING ELECTRONIC SIGNATURES

TECHNICAL FIELD

The present disclosure relates to generation of an electronic signature for securely signing content.

SUMMARY

Aspects of the invention provide a method of electronically signing content comprising methods at a requestor, a service and signer and a method of creating a signature as claimed. Aspects of the invention further provide a computer program product comprising executable software to implement the method and suitably programmed computers and systems.

A first aspect of the invention provides a method of electronically signing content, the method comprising: presenting at a signing device associated with a signer (i) content to be signed and (ii) an attribute sharing item; detecting that the signer has accessed the attribute sharing item to provide one or more identity attributes which uniquely identify the signer, and optionally populating an identity sheet with the one or more identity attributes; detecting that the signer has initiated a signing action at the signing device; and transmitting the signing action and the identity attributes to a signing service which is configured to create an electronic signature including encrypting the content to be signed and the one or more identity attribute.

The attribute sharing item may be either a graphical item, such as a barcode or a QR code, or it may comprise a link. In the case of the graphical item, the signing device accesses the item by, for example, scanning it. The graphical items may comprise a token containing attribute identifiers which enable identity attributes to be accessed from an identity platform which holds a digital identity for the signer. These attributes may then populate the identity sheet. If the attribute sharing item comprises a link, the link is presented to the signer at the signing device. When the signer accesses the link, the identity sheet is presented to the signer for populating. Identity attributes may be presented to the signer in plain text and on the user interface of the signing device.

In some embodiments, a biometric identifier, provided by the signer, may be transmitted to the signing service in addition to the signing action. The biometric identifier may comprise a photograph of the signer, such as a 'selfie'.

A second aspect of the invention provides a method of electronically signing content, the method comprising: receiving at a signing server (i) content to be signed, (ii) address of at least one signer, and (iii) an identifier of at least one verification attribute of the signer; generating an electronic message to be transmitted to the signer's address, the message comprising the content and the identifier of the at least one verification attribute; causing the electronic message to be transmitted to the signer's address; receiving from the signer a signing action and the at least one verification attribute identified by the identifier; accessing a digital identity of the signer to retrieve a private key associated with the signer; and using the private key to cryptographically sign the content and the at least one verification attribute of the signer in a single encrypted electronic signature.

In accordance with the second aspect, the electronic message may contain a link to an identity sheet which is to be populated by the signer. Alternatively, the message may contain a token which, when accessed by the signing device, accesses attributes from the digital identity. These attributes may then populate the identity sheet. Attributes may populate the identity sheet in plain text.

The attributes required from the signer may be defined by a sharing policy. A sharing request may be transmitted to a digital identity platform which contains the digital identity of the signer to access a sharing token which comprises the sharing policy. The sharing request may also comprise a token identifying a requester who has transmitted the signing request to the server.

If there are multiple signers, the electronic message comprising the content to be signed by each signer may be transmitted to each of the signers at their respective signing addresses. The digital identity of each signer may be accessed to retrieve the private key associated with each signer, the respective key being used to cryptographically sign the content for each signer.

A hash of content and/or the hash of the at least one verification attribute may be generated. Electronic signatures may then be produced by cryptographically signing a hash, or a content hash and an attribute hash, using the private key of the signer.

In some embodiments, attributes may be cryptographically signed with the content. In other embodiments, an electronic signature may be generated by cryptographically signing a biometric identifier received from the signer and the content.

A third aspect of the invention provides a method of obtaining an electronic signature for electronically signing content, the method comprising: at a requesting device associated with the requestor, providing content to be signed and a request for at least one identity attribute to be included in an electronic signature for the content; transmitting the content to be signed and the attribute request to a signing server, and receiving a signed version of the content, the signed version including an electronic signature which comprises an encrypted version of the content and the identity attribute, the encryption having used a private key accessed from a digital identity of the signer.

In embodiments of the third aspect, the request may define the address of the signer to sign the content. If there is more than one signer, the request may define multiple addresses. The request may also define multiple pieces of content, each to be signed by one or more of the signers. The request may comprise signature options. The signing request may include a credential enabling the requestor to access a sharing token from a digital identity platform, the request including the sharing token.

A fourth aspect of the invention provides a method of generating an electronic signature comprising: generating a first cryptographic hash of content to be signed by a signer; generating a second cryptographic hash of a biometric identifier of the signer; and encrypting the first and second hashes using a private key associated with the signer to generate the electronic signature.

The biometric identifier may be a photographic or facial image of the signer. The photographic image may be taken at the time at which the signer generates a signing action for signing the content.

In some embodiments of the fourth aspect, a hash of the first and second cryptographic hashes may be generated. The electronic signature may comprise this hash. Any generated hashes may be published to a blockchain with a timestamp. In some embodiments, one or both of the first and second hashes may be encrypted with a timestamp. The electronic signature may also be timestamped.

A fifth aspect of the invention provides a computer device configured as a signing device comprising: a user interface;

a memory for storing computer code; and a processor configured to execute the computer code which, when executed, causes the processor to: present (i) content to be signed and (ii) an attribute sharing item at the user interface; detect that the signer has accessed the attribute sharing item to provide one or more identity attributes which uniquely identify the signer; detect that the signer has initiated a signing action; and transmit the signing action and the identity attributes to a signing service which is configured to create an electronic signature including encrypting the content to be signed and the one or more identity attribute.

A sixth aspect of the invention provides a computer device configured as a requesting device comprising: a user interface; a memory for storing computer code; and a processor configured to execute the computer code which, when executed, causes the processor to: provide content to be signed and a request for at least one identity attribute to be included in an electronic signature for the content; transmit the content to be signed and the attribute request to a signing server; and receive a signed version of the content, the signed version including an electronic signature which comprises an encrypted version of the content and the identity attribute, the encryption having used a private key accessed from a digital identity of the signer.

A seventh aspect of the invention provides a signing server configured to: receive from a requesting device (i) content to be signed, (ii) address of at least one signer, and (iii) an identifier of at least one verification attribute of the signer; generate an electronic message to be transmitted to the signer's address, the message comprising the content and the identifier of the at least one verification attribute; cause the electronic message to be transmitted to the signer's address; receive from a signing device a signing action and the at least one verification attribute identified by the identifier; access a digital identity of the signer to retrieve a private key associated with the signer; and use the private key to cryptographically sign the content and the at least one verification attribute of the signer in a single encrypted electronic signature.

An eighth aspect of the invention provides a device for generating an electronic signature configured to: generate a first cryptographic hash of content to be signed by a signer; generate a second cryptographic hash of a biometric identifier of the signer; and encrypt the first and second hashes using a private key associated with the signer to generate the electronic signature.

A ninth aspect of the invention provides a computer system for electronically signing content comprising: a signing device comprising: a processor, a memory, and a user interface; a requesting device comprising: a processor, a memory, and a user interface; a signing server configured to: receive (i) content to be signed, (ii) address of at least one signer, and (iii) an identifier of at least one verification attribute of the signer; generate an electronic message to be transmitted to the signer's address, the message comprising the content and the identifier of the at least one verification attribute; cause the electronic message to be transmitted to the signer's address; receive from the signer a signing action and the at least one verification attribute identified by the identifier; access a digital identity of the signer to retrieve a private key associated with the signer; and use the private key to cryptographically sign the content and the at least one verification attribute of the signer in a single encrypted electronic signature; wherein the memory of the signing device stores computer code, which, when executed on the processor of the signing device, results in the device being configured to: present the electronic message at the user interface; detect that the signer has accessed the attribute sharing item to provide one or more identity attributes which uniquely identify the signer; detect that the signer has initiated a signing action; and transmit the signing action and the identity attributes to the signing service; wherein the memory of the requesting device stores computer code which, when executed on the processor of the requesting device, results in the device being configured to: provide content to be signed and a request for at least one identity attribute to be included in an electronic signature for the content; transmit the content to be signed and the attribute request to the signing server; and receive a signed version of the content, the signed version including an electronic signature.

A tenth aspect of the invention provides a computer program product comprising code stored on a computer readable storage medium and configured when executed to implement any of the methods defined above.

BRIEF DESCRIPTION OF THE DRAWINGS

To assist understanding of the present disclosure and to show how embodiments may be put into effect, reference is made by way of example to the accompanying drawings in which:

FIG. 3 shows an example table illustrating a data structure holding metadata defining example attribute fields and example values, FIGS. 4a to 4j show an example method to be implemented by a requesting user to send a document signing request to a signing user, FIGS. 5a to 5i show an example method to be implemented by a signing user to sign a document receiving in a signing request from a requesting user, FIGS. 7a to d show schematically an example diagram of architectural components of an electronic signing system.

FIG. 10A shows schematically example components that are used to generate a hash.

DETAILED DESCRIPTION

The present disclosure relates to creating electronic signatures in association with the verified identity of a signer. The electronic signature creation described herein has a number of features enabling documents to be signed efficiently and securely, in a manner which is uniquely linked to the signatory. The techniques enable an electronic signature to be created in which it is capable of identifying the signatory. The signature is created using electronic signature creation data that the signatory can use under his sole control, and the signature is linked to the data in such a way that any subsequent change in the data is detectable.

The electronic signature creation utilises a digital identity platform which enables the user to utilise their own device (smart phone, tablet or any other suitable device) to validate their identity. Such a digital identity platform has been described in the following applications in the name of the applicant, the contents of which are herein incorporated by reference: U.S. Ser. No. 14/622,527, U.S. Ser. No. 14/622, 709, U.S. Ser. No. 14/622,549, U.S. Ser. No. 14/622,737, U.S. Ser. No. 14/622,740.

Figure 1:
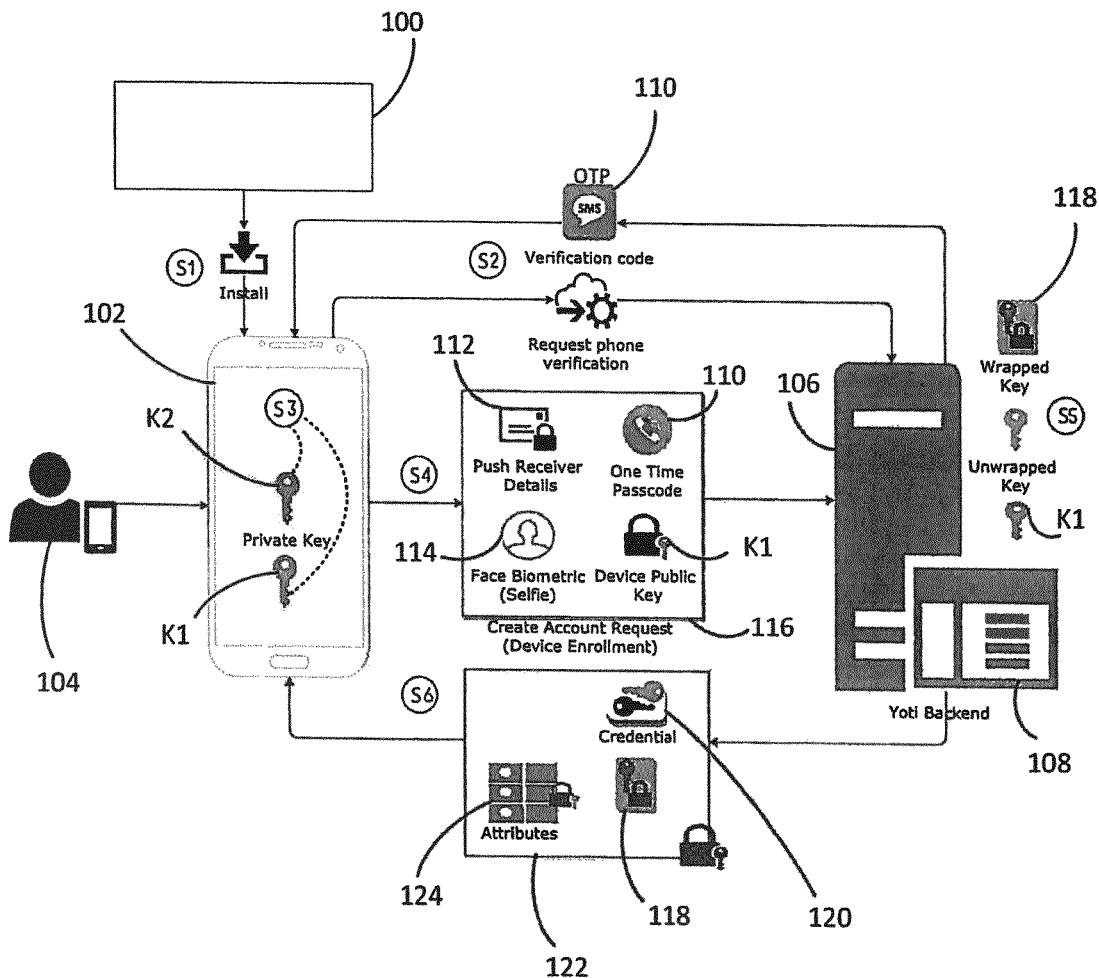
FIG. 1 shows schematically an example of a digital identity platform to be utilised in the electronic signature creation.

Notwithstanding those disclosures, it is deemed useful to include a concise description of such a digital identity platform to describe the aspects which are utilised in the electronic signature creation. Reference is made to FIG. 1. FIG. 1 illustrates an application 100 which may be installed on a user's device 102. The user is designated by reference numeral 104. As mentioned, the user device may be any computer device, including smartphones, tablets or other devices which are becoming available, such as wearables. FIG. 1 also illustrates a back end system 106. The back end system 106 comprises a server with one or more processors for executing programs to deliver the functionality of the back-end system. The back end system also comprises a secure store 108 which will be described later. The user's device has a display for displaying instructions, information etc. to a user, and one or more processors for executing programs to deliver the functionality of the user's device.

The present signature generation mechanism can be enhanced by features of the identity platform. The process can make use of credentials which are randomly generated one-time use only and bound to particular sets of attributes for a particular user.

As described in the earlier applications, credentials are bound to a device.

Credentials are randomly generated from a set of digital attributes associated with a particular entity (in this case, the requestor). The use of such a credential allows a user to determine that the requestor for that signing ceremony is valid. Credentials also allow access to the digital platform to create a sharing token to be transmitted from the owner of the credential.

Credentials are generated by creating a random salt value and combining this with the device identification number. The result is then used as the initial seed value for an iteratively generated SHA-2 hash value with the number of rounds of iteration being determined at random. In the present case a virtual instance of a signing service can be launched which has its own credential generated by the identity platform.

A user 104 of the digital identity platform is able to upload and register copies of their identity documents and in return they receive an anchored digital ID which can be used to verify their identity to third parties without needing to present these identity documents. They are also able to specify the nature and quantity of personal information which will be made available when doing this. A particularly effective identity anchor is a photograph (facial image) or other biometric identifier. Identity may be anchored by identity documents such as passports, driving licenses, etc. which have been issued by a secure authority. Identity attributes are exemplified later.

It will be evident from the following that any kind of data items pertaining to identity may be utilised as attributes, and entered into the system in any appropriate manner.

The functionality of the digital identity platform will be understood by describing the process flow illustrated in FIG. 1.

In step S1, the application 100 is installed on the user device 102. At step S2, a one-time pass code (OTP) is requested from the back end server 106 by providing a device identity (DID), such as the device phone number. The pass code 110 is sent to the device to be verified. It may be sent via SMS or any other suitable message transmission medium. At step S3, the application 100 executing on the mobile device 102 generates a public/private key pair K1, K2. The private key K2 and the public key K1 are stored in a local memory at the mobile device 102. Note that the private key K2 remains secret to the device, and the public key K1 is shared with the back end server 106. At step S4, the device transmits push receiver details 112, the one-time pass code 110, a biometric identifier 114 and the public key K1 to the back end server 106. These items may be sent in a single push message 116, or in multiple messages or in any appropriate way. The biometric item is a piece of biometric information which uniquely identifies the user 104. This could be for example a photo, such as a selfie, of the user. However, any other piece of biometric information could be utilised. This could be fingerprint, iris or retina images as examples. The information items in the message 116 are utilised at the back end server 106 for account creation. On verifying the one-time pass code 110 an account is created for the user 104. This may involve liveness challenges and biometric uniqueness checks. With the account created, a set of unwrapped keys are generated for the user and at step S5 they are encrypted to provide a wrapped key 118. A credential 120 is also generated. The wrapped key 118 and credential 120 are packaged up into a push message 122 encrypted with the device's public key K1. The push message may also include a set of attributes 124 which are discussed later.

The push message 122 is sent in step S6 to the mobile device 102 using token encryption. The mobile device 102 decrypts the payload using its private key K2.

Figure 2:
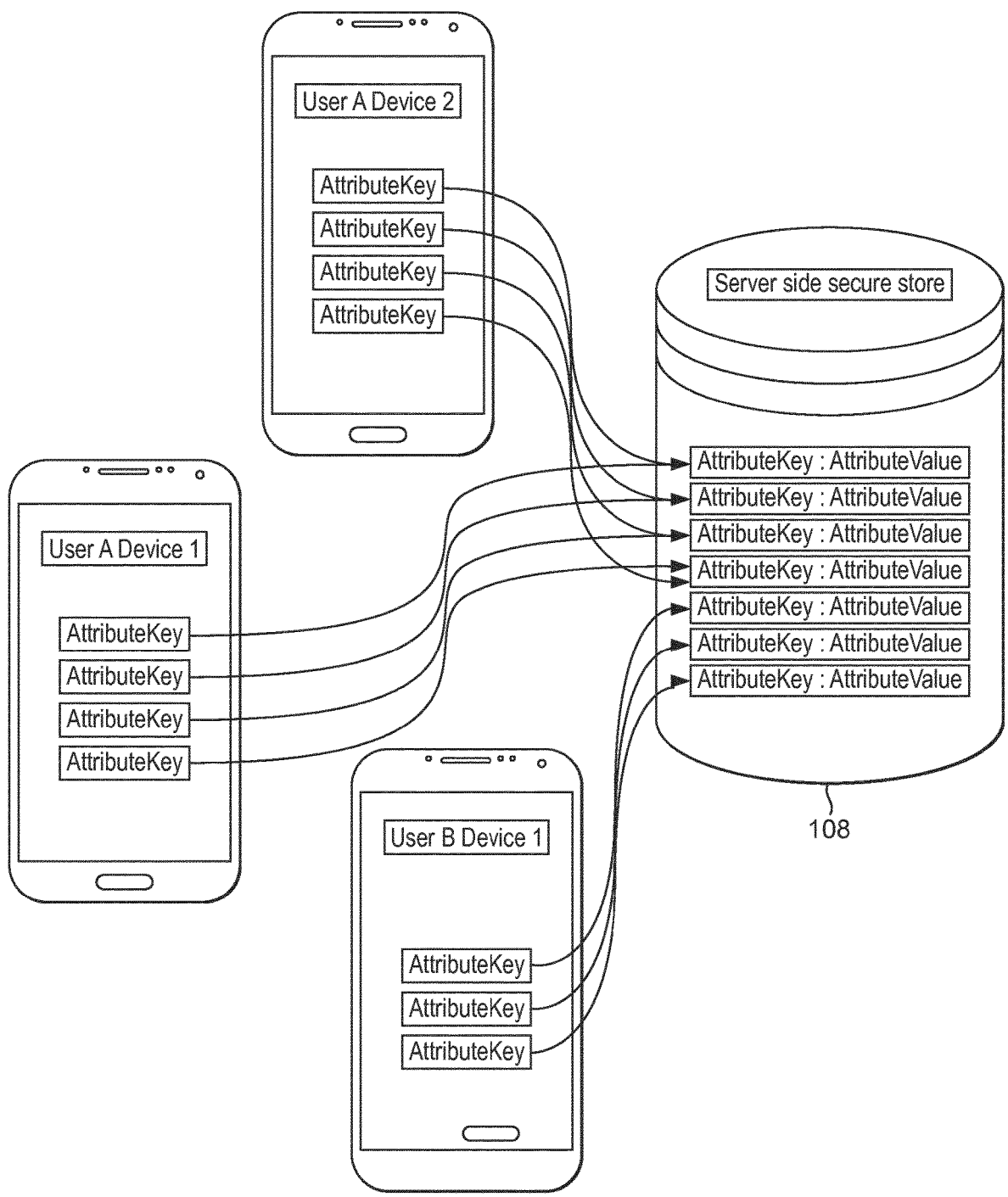
FIG. 2 shows schematically an example view of how attributes are stored in an attributes store.

The identity of a user of the digital identity platform is defined by a collection of attributes that together uniquely define their identity. The platform itself does not know the collection of attributes that constitutes one of its uniquely identified users. The collection of attributes cannot be tied together using data from the service at the back end. Only a user's own device knows the collection of attributes that make up that user's identity. FIG. 2 is a simplified view of how attributes are stored in the attributes store 108. Each attribute has an attribute value held at the store 108 which can be accessed by an attribute key. In the earlier applications, these keys were held locally at the user's device. In the present case, they may be delivered as part of a signing process to identify a signer. Each attribute is a piece of information about the user. Each attribute is described with metadata which defines an attribute field, for example name, type, value, anchors et cetera. In this context, anchors are verified documents which have been utilised to provide attributes into the store, as mentioned earlier. FIG. 3 is a table illustrating a data structure holding metadata defining the attribute fields and example values. In order to allow a user to browse their data, a subset of the attribute metadata may be stored on the user's device.

Figure 6:
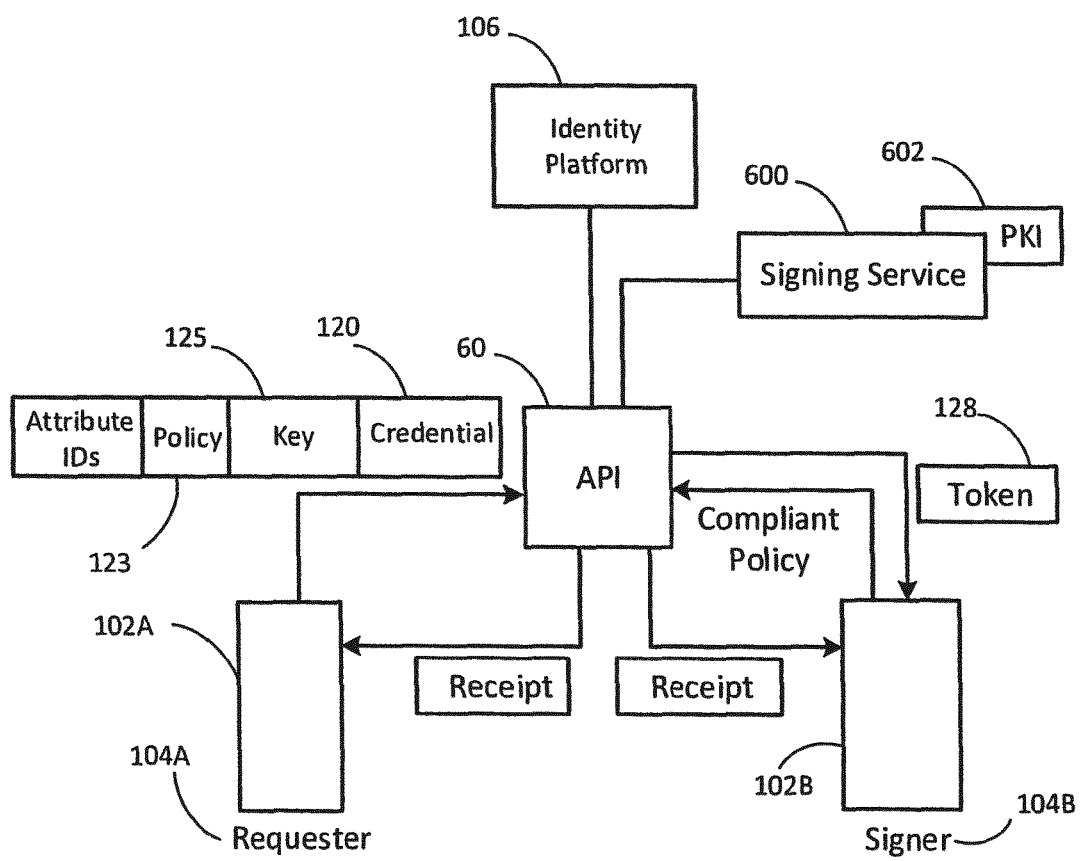
FIG. 6 shows schematically an example of how attributes may be shared using the digital identity platform.

FIG. 6 is a schematic view to illustrate e-signing in one embodiment which uses the identity platform. A requester 104A via a requesting device 102A uploads documents to be signed. They are transmitted to a signer 104B at his device 102B via an API 60 which can access a signing service 600 and the identity platform. This enables uniquely secure and trackable signatures to be generated as described in the following.

Figure 1A:
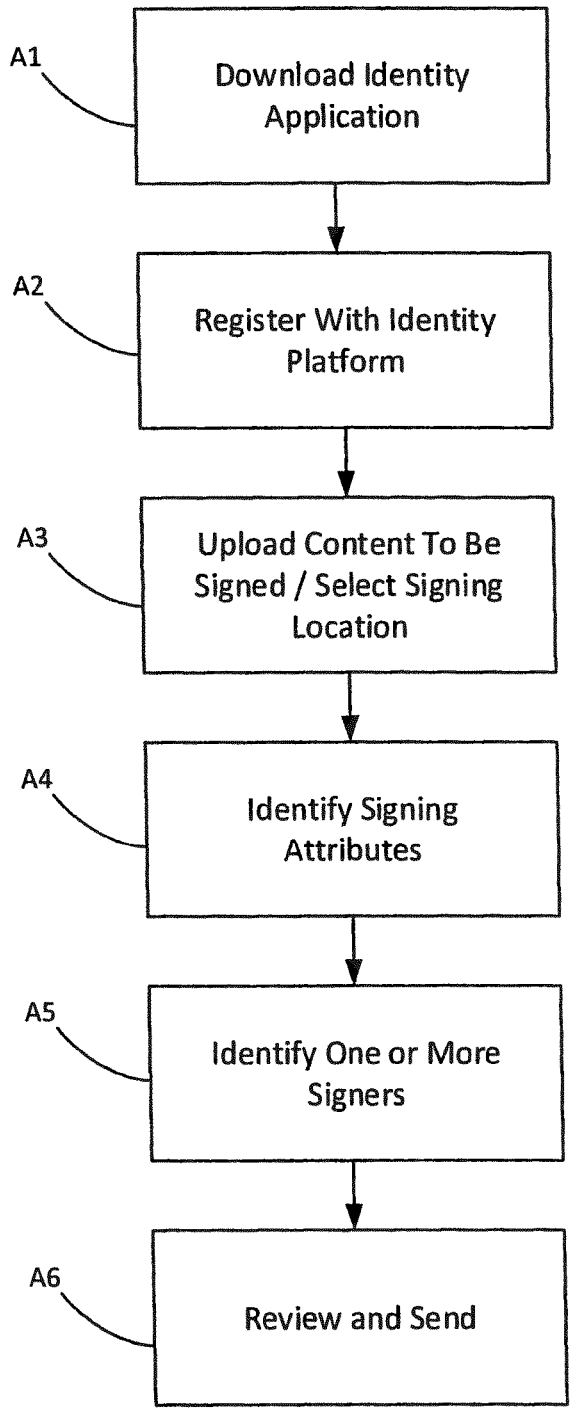
FIG. 1A shows schematically an example of a flow to be used by a requester to send a signing request to a signing user.

FIG. 1A illustrates an example flow to be used by a requester to send a signing request to a signing user. At step A1, the requester downloads the digital identity application 100 described above. The requester, at step A2, registers with the identity platform. For example, the requester registers using a user identifier, such as an email address, and one or more biometric identifiers. The requester would like one or more recipients to sign a document. At step A3, the requester selects and uploads the document that is intended to be signed. The requester then, at step A4, chooses the particular signing attributes (e.g. name, DOB, ID photo, address, etc.) that are required to populate an identity sheet which will be signed with the document. At step A5, the requester identifies the intended recipients. The recipients may be identified by an identifier unique to each recipient such as, for example, a (verified) email address, phone number, etc. The order of steps A4 and A5 are interchangeable. Finally, at step A6 the requester reviews the signing request (e.g. the document, identified attributes, identified signers, etc.) and sends the signing request to the signers. For example, the request may be sent by email via the signing service 600, (signing platform).

Attributes are used for creation of electronic signatures as described herein. Attributes are shared using a sharing token as will be described in more detail later, as part of the signing process.

Figure 9:
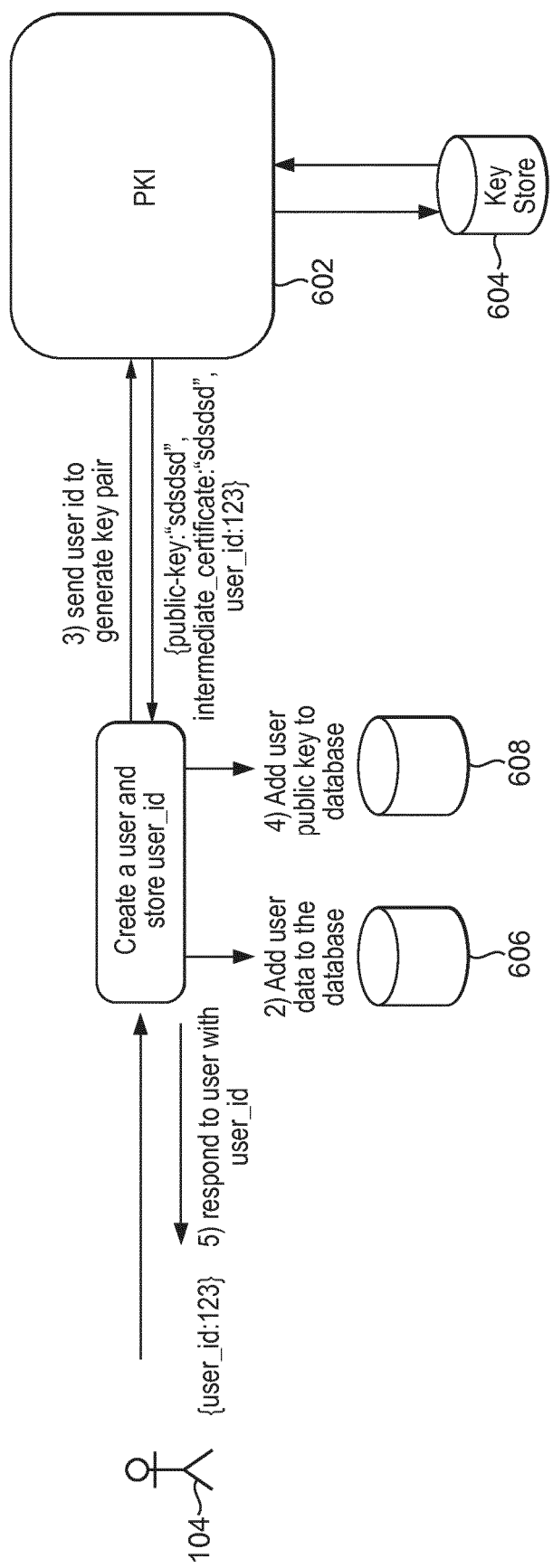
FIG. 9 shows schematically an example flow for the creation of keys.

Before a document can be signed using the electronic signature creation process described herein, the user 104 must first acquire a private signing key. This key is acquired from a PKI server (Public Key Infrastructure) 602 which is associated with the signing service. FIG. 9 illustrates the flow for acquiring a signing key from the PKI server. The user 104 provides a user identifier to an identity service at the PKI server which creates a user account and adds the user data to a database 606. For example, the user identifier could be a unique email address for that user, which has been verified in any known way. The user identifier is sent to the PKI server which generates a key pair from a key store 604 and signs it with a digital identity certificate. The user public key is stored to a database 608.

FIGS. 4a to 4j show an example method to be implemented by a requesting user to send a document signing request to a signing user.

Figure 4A:
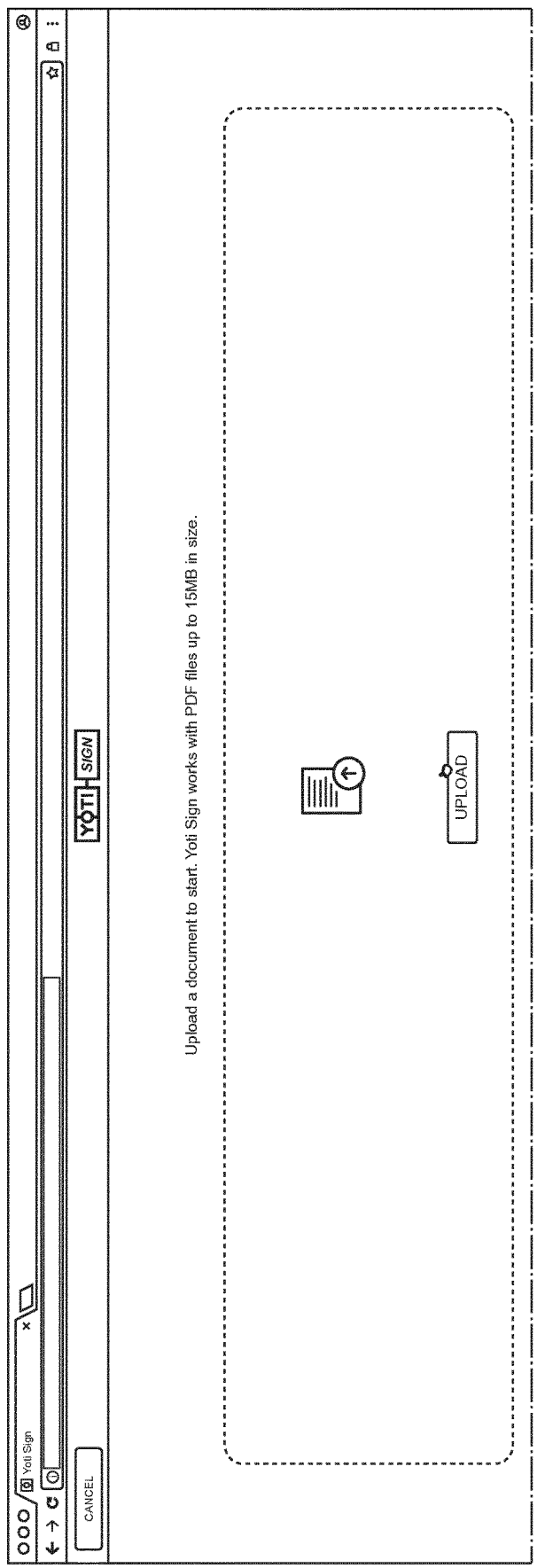
Figure 4B:
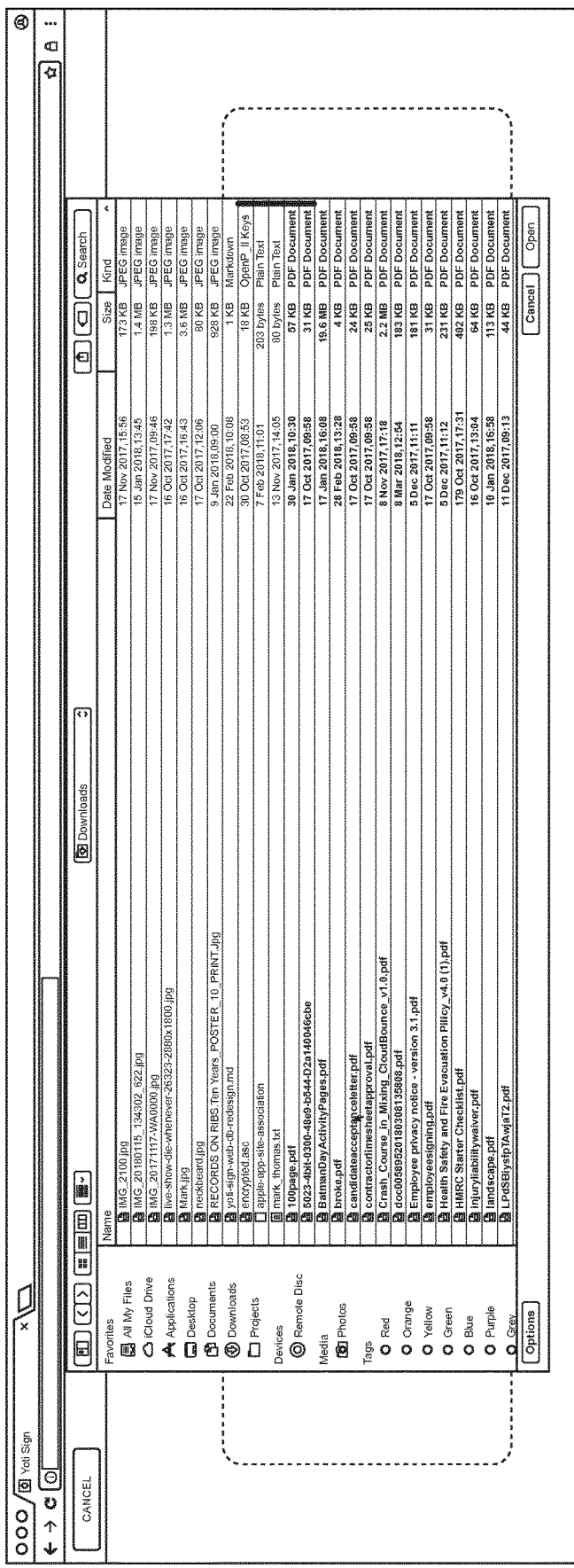
Figure 4C:
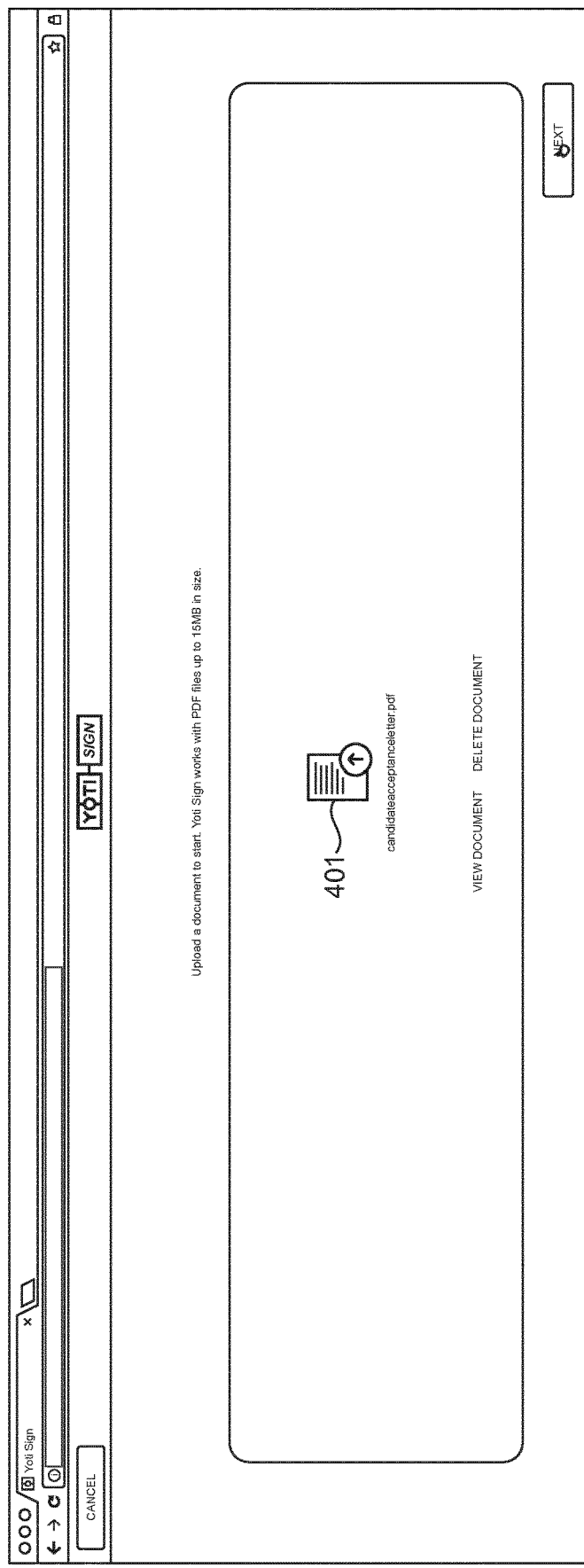
Figure 4D:
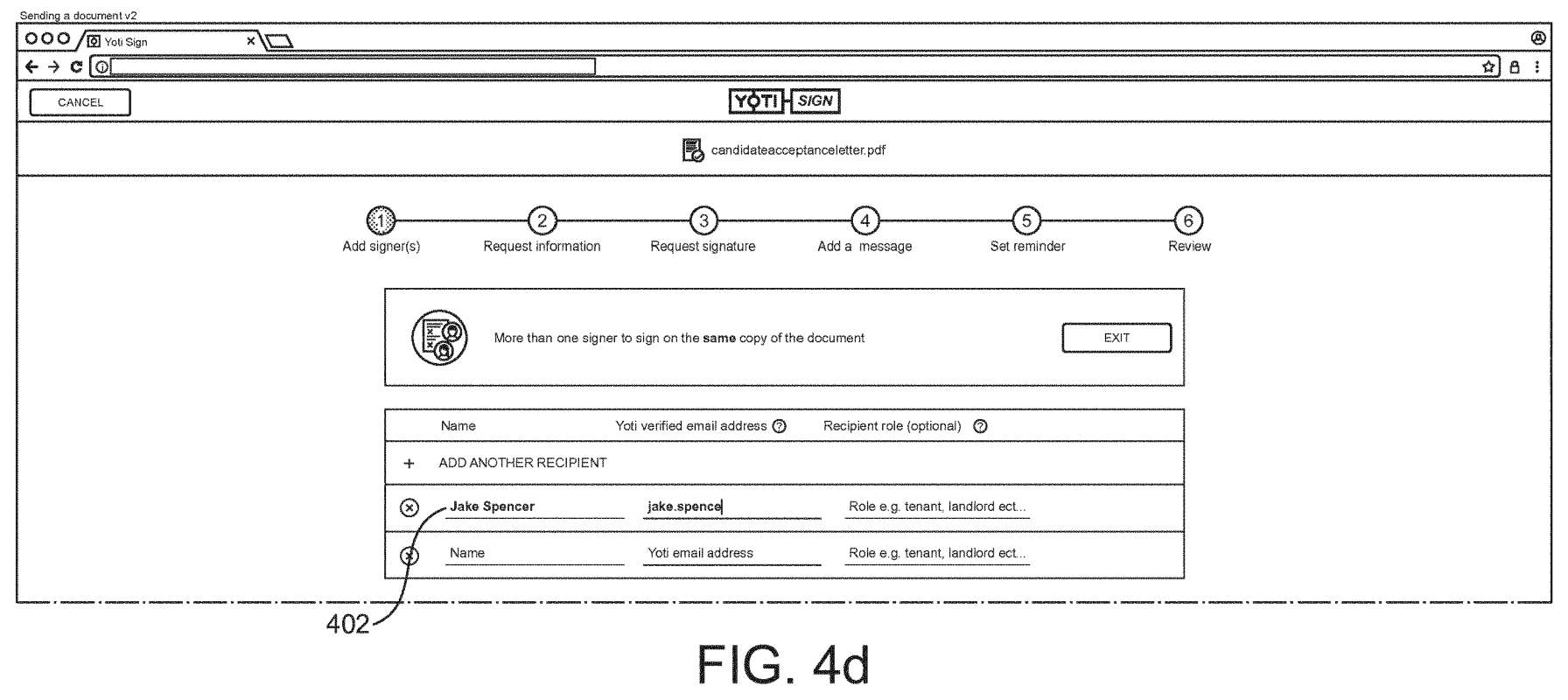

As shown in FIG. 4a to 4c, the requester (the user that requires a document to be signed by a signee) first selects to upload a content in the form of a document 401. The content 401 may be, for example, a pdf document, a word document, an image, a video or any other kind of content. The document 401 may be uploaded from the requester's device or accessed and downloaded via a server (e.g. from the cloud). The requester then provides a unique identifier 402 of a recipient such as, for example, an email address or phone number (see FIG. 4d). The unique identifier 402 may have been previously verified by the digital identity platform. The unique identifier 402 is a globally unique identifier or at least uniquely identifies the recipient within the signing service. As shown in FIG. 4d, multiple recipients can be added, each with a respective unique identifier 402. Additional identifying information of a respective recipient can be added, such as the role name and role of the recipient.

Figure 4E:
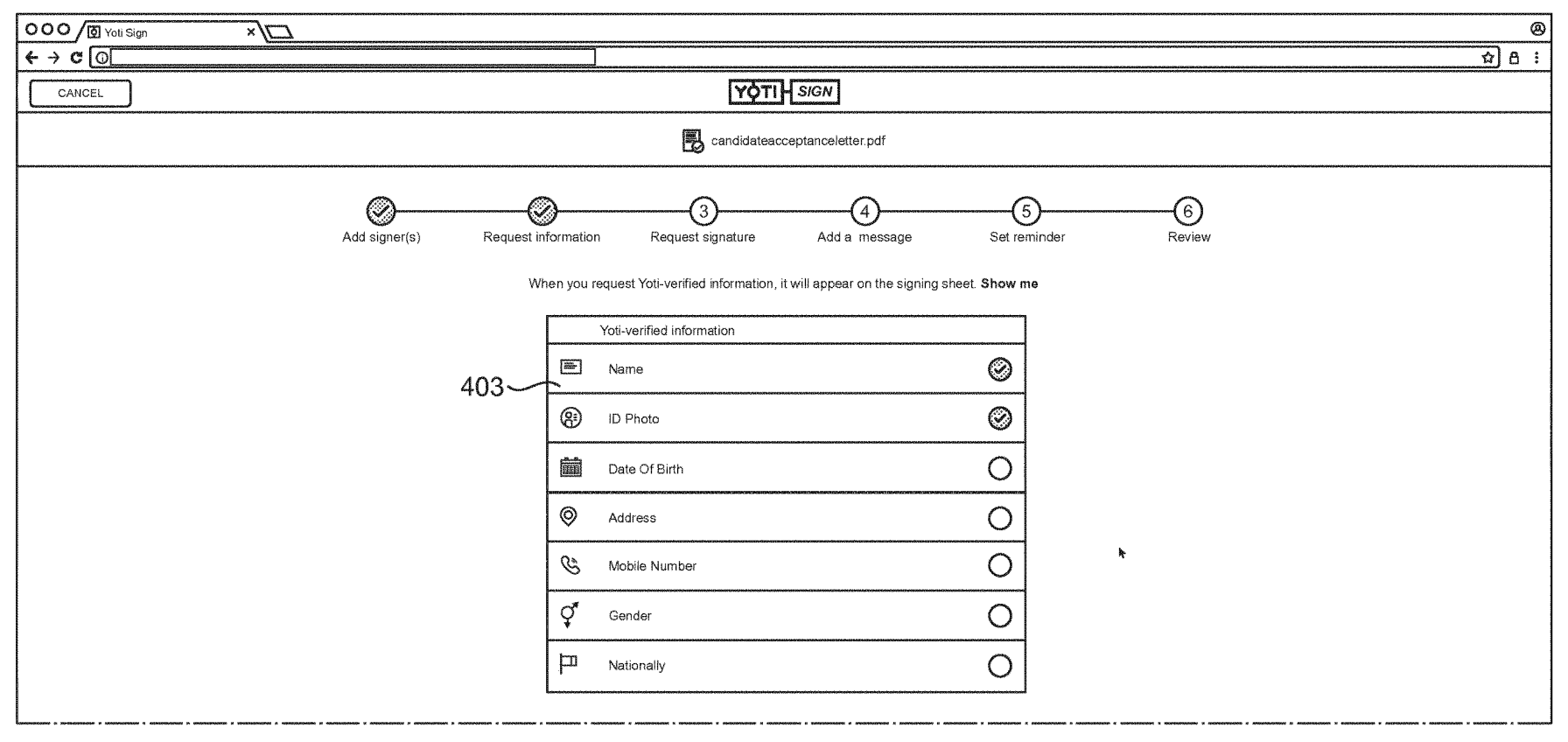

FIG. 4e shows the requester selecting one or more attributes 403 that are to be populated on the identity sheet attached to the document 401 to be signed. Each attribute 403 is a piece of information about a user and multiple attributes 403 together uniquely define the identity of the user. For example, the one or more attributes 403 that may be selected include: name (first name and/or surname), identify photo (e.g. a photo previously uploaded to a digital identity platform by the user and verified by that digital identity platform), date of birth and/or age, address, phone number, gender, nationality, national insurance number, etc. Each attribute has been verified and stored (separately) by the digital identity platform.

Figure 4F:
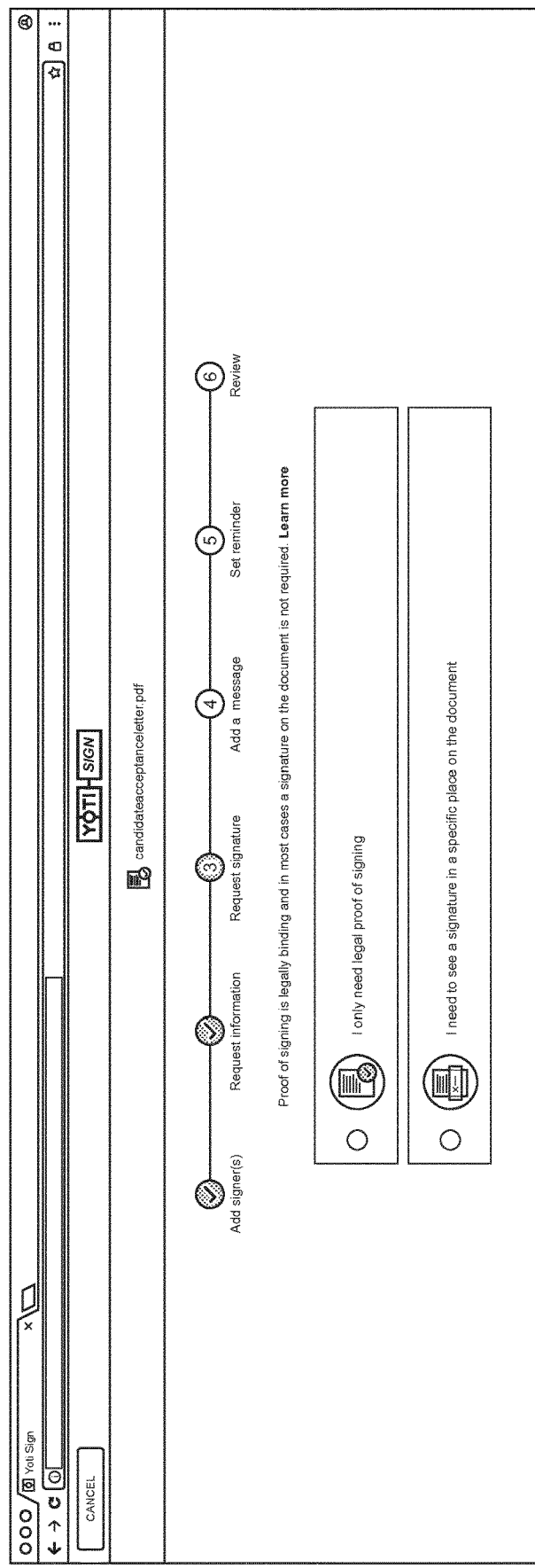
Figure 4G:

FIG. 4f shows that the requester may choose whether the document 401 requires a legal proof of signing, or a written signature is required on the document 401. If a legal proof of signing is required, the document signed by the signee does not require an actual written signature inserted or placed onto the document 401. In contrast, if the requester selects that a signature is required, the document signed by the signee must contain their written signature (or at least a representation of their signature, usually a textually stylised version of their name). The requester is given the option to select a specific place in the document 401 where the signature should be placed. For example, as shown in FIG. 4g, if the document 401 contains a signature field 404, the requester can select this position for their written signature to appear.

Figure 4H:
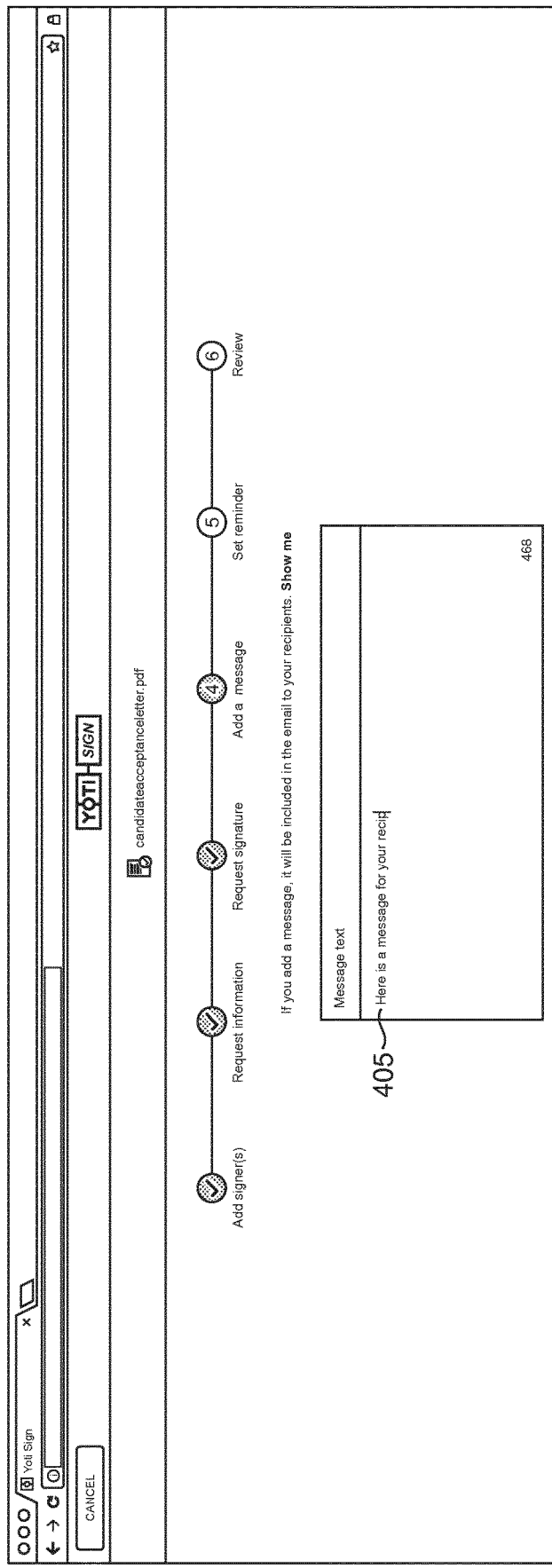

Optionally, as shown in FIG. 4h, the requester can add text to a message field 405 which will be included in the signing request that includes a link to the signing ceremony. As discussed later, the signing ceremony enables the document 401 to be signed, with a populated identity sheet (cover sheet). For example, the message 405 may contain some useful context explaining the purpose of the document 401, any deadlines for signing the document 401, information about the requester, etc.

Figure 4I:
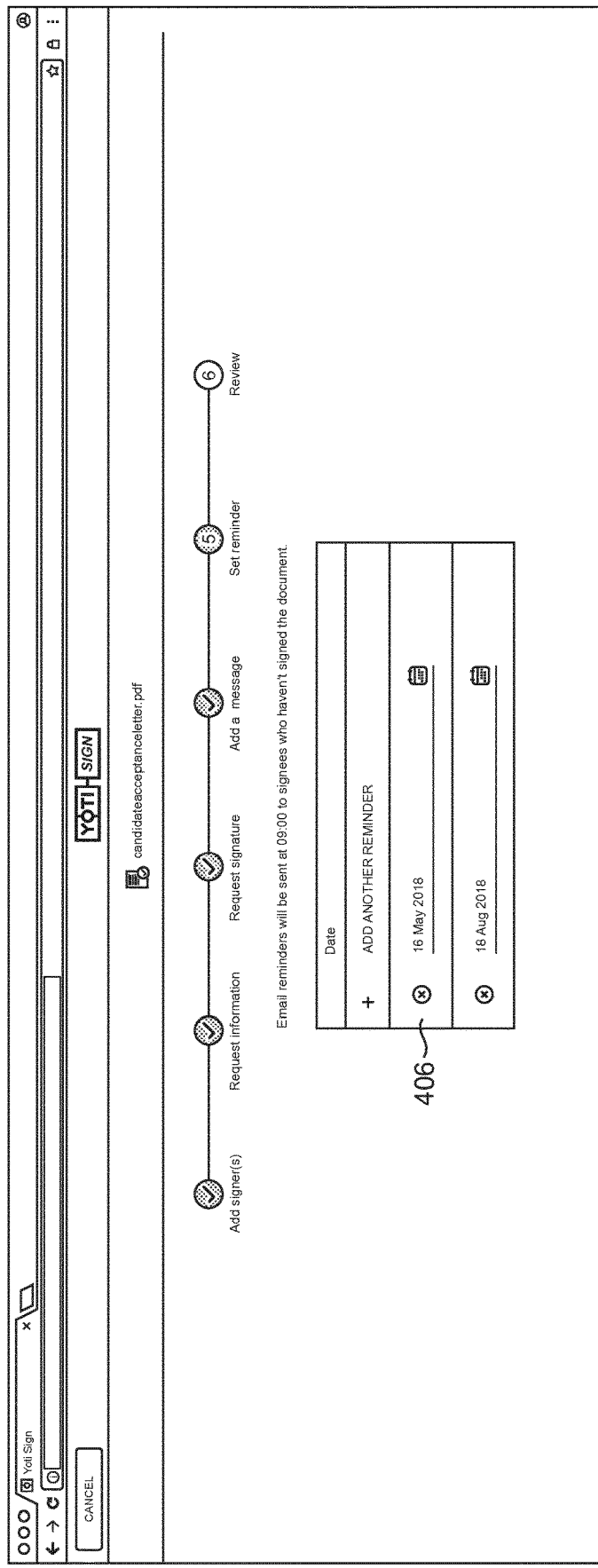

FIG. 4i shows that the requester may also optionally set one or more reminders 406 to remind the recipient to sign the document 401 before a date, e.g. a deadline. The reminders 406 may be automatically sent to the recipient on the chosen dates via email, text message, etc.

Figure 4J:
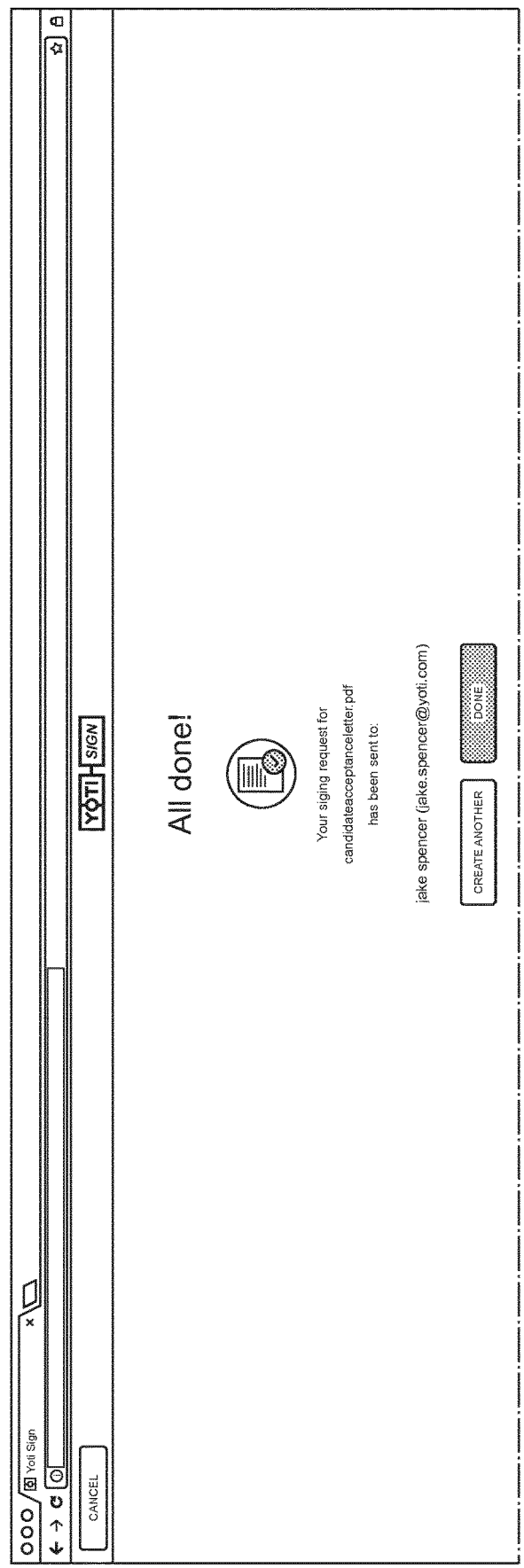

Finally, the requesting flow is completed in FIG. 4j with the signing request being sent to the signing service to send to one or more recipients, e.g. via email. The request may alternatively be sent to the signing service and directly from the requester to the recipient(s). The signing request may include the document 401 or a link (e.g. a hyperlink) to the identity document 401. If multiple recipients are selected, each recipient is sent a separate signing request containing a link to a respective identity sheet (requesting the attributes of the respective recipient) and a respective document 401, or a link to the document, (to be signed by the respective recipient). The identity sheet is referred to herein sometimes as a cover sheet. It is a collection of one or more identity attributes, which may manifest itself as a visible sheet, but not necessarily. If there are multiple signers on a document, multiple identity sheets are created, one per signer. When using the digital identity platform, the request triggers a sharing action over the digital identity platform to generate a sharing token which engenders a cover sheet. Alternatively, the request can include a cover sheet or a link to a cover sheet. Generation of the cover sheet is described later.

FIGS. 5a to 5i show an example method to be implemented by a signing user to sign a document received in a signing request from a requesting user.

Figure 5A:
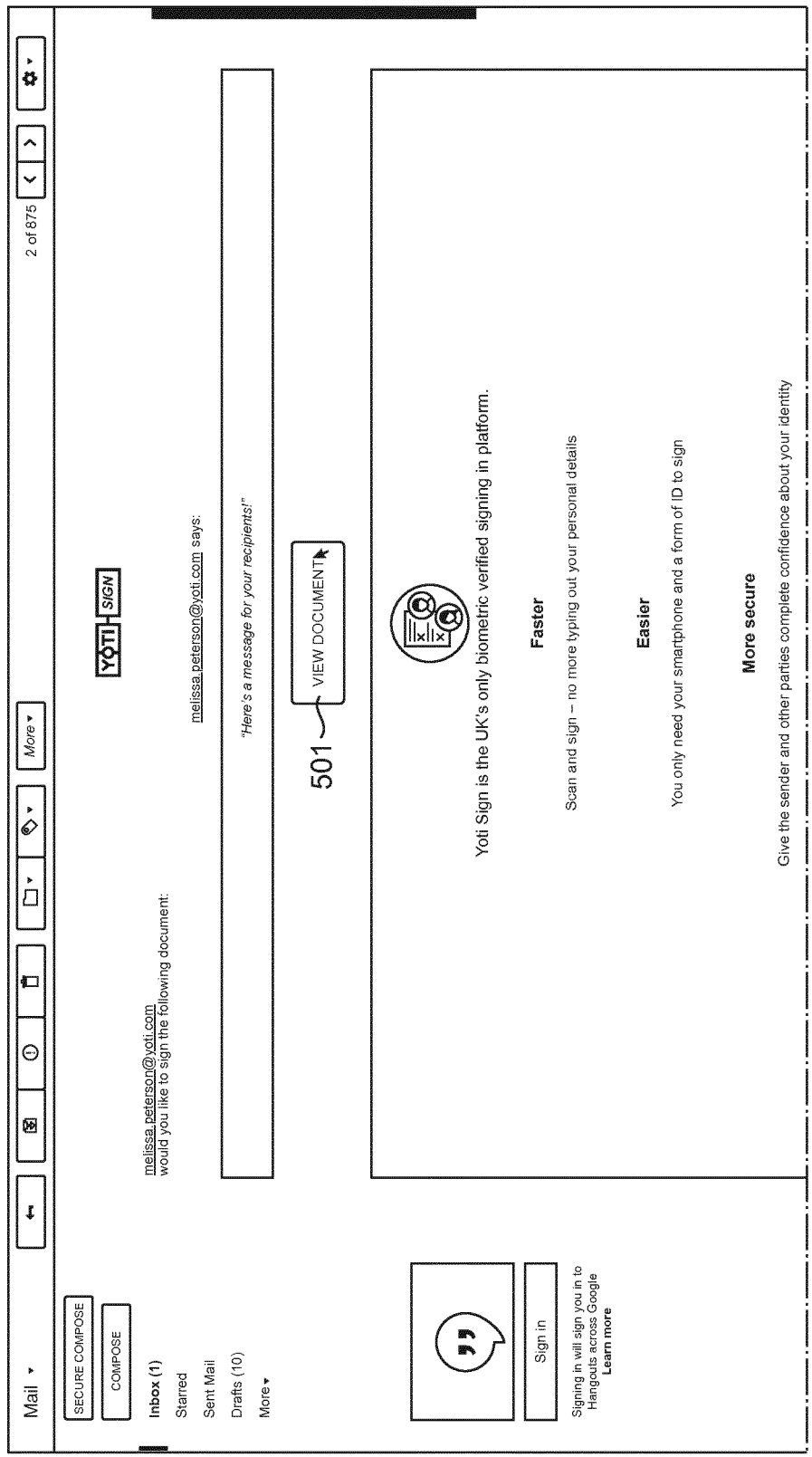

As shown in FIG. 5a, a signer (i.e. a recipient of the signing request) receives the signing request. The signing request may be received via email or other communication modes such as text message, instant message, etc. The signer may be using a web based portal on a screen, or he may be using his own mobile device. The signing request includes, the document 503 (shown in FIG. 5c) and may include a link 501 to view the cover sheet 502 (shown in FIG. 5b). The signer is presented on the web based portal or on his own display with the cover sheet 502 which includes various fields 504. One or more fields 504 correspond to the requested attributes. At this point, the fields 504 are not populated with the signer's attributes and instead only indicate which attributes have been requested. Another field details the name, identifier and/or contact information of the requester, whilst another field details the name, identifier and/or contact information of the signer. The signer is also presented with the document 503 to be signed. At this point the document 503 has not been signed, i.e. there is no signature on the document. The document 503 may be forwarded to a third party such as, for example, a lawyer for checking the legal ramifications of signing the document 503. The document 503 may also be sent back to the requester as a way of checking that it is indeed the same document 503 that the requester intended to send to the recipient.

Figure 5D:
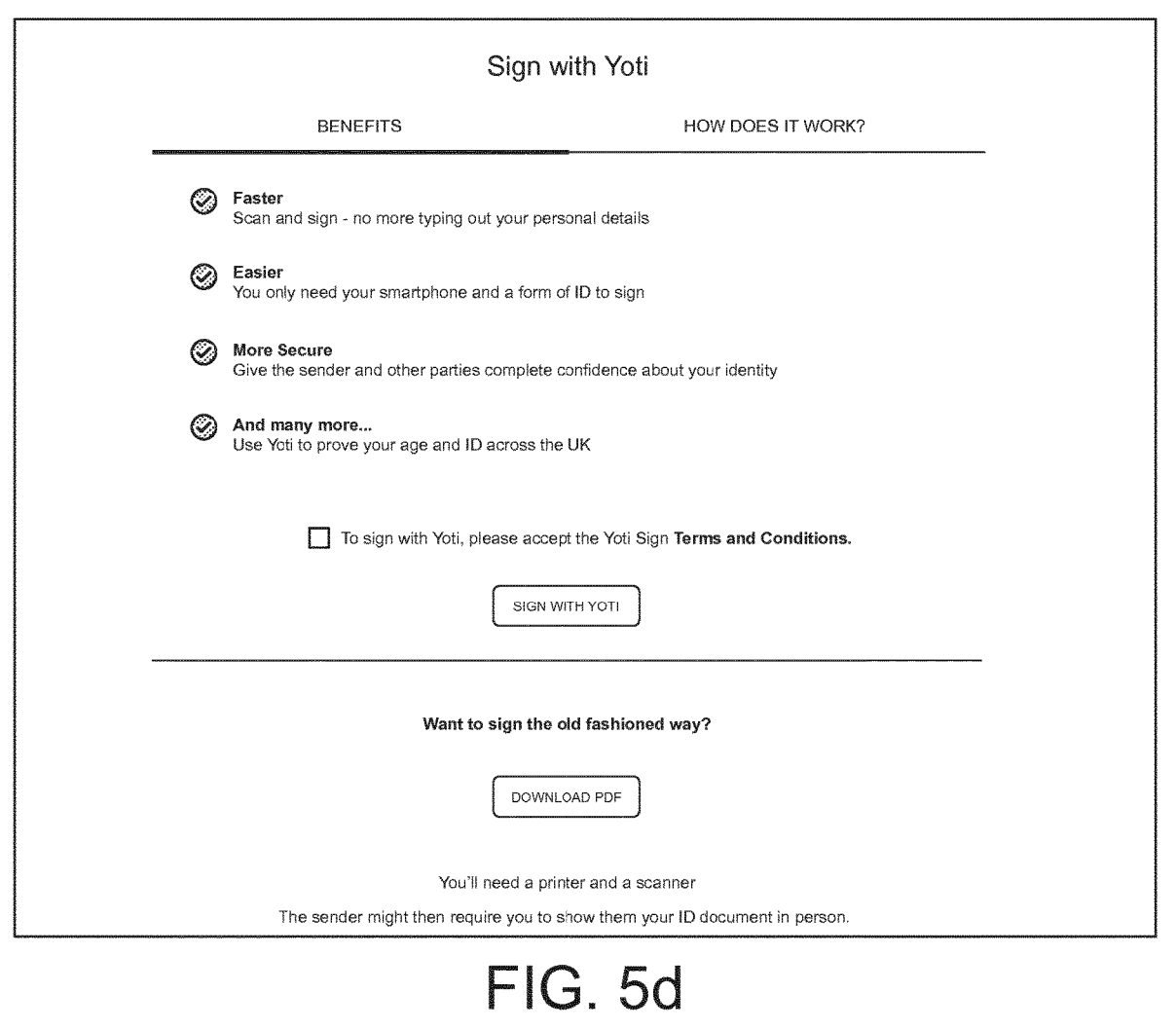

FIG. 5d shows that the signer may select to sign the document 503 using the signing service or to conventionally sign the document 503 by printing the document and signing the document by hand. If the signee selects to sign the document 503 using the signing service, the signee is presented with a sharing token 505 generated by the identity platform 106. The token 505 may be any device-readable optical object generated by the digital identity platform 106. For example, the token 505 may be a QR code, or a barcode. The token could be a hyperlink. Alternatively, the token may be an electronic message to be consumed by software.

Figure 5E:
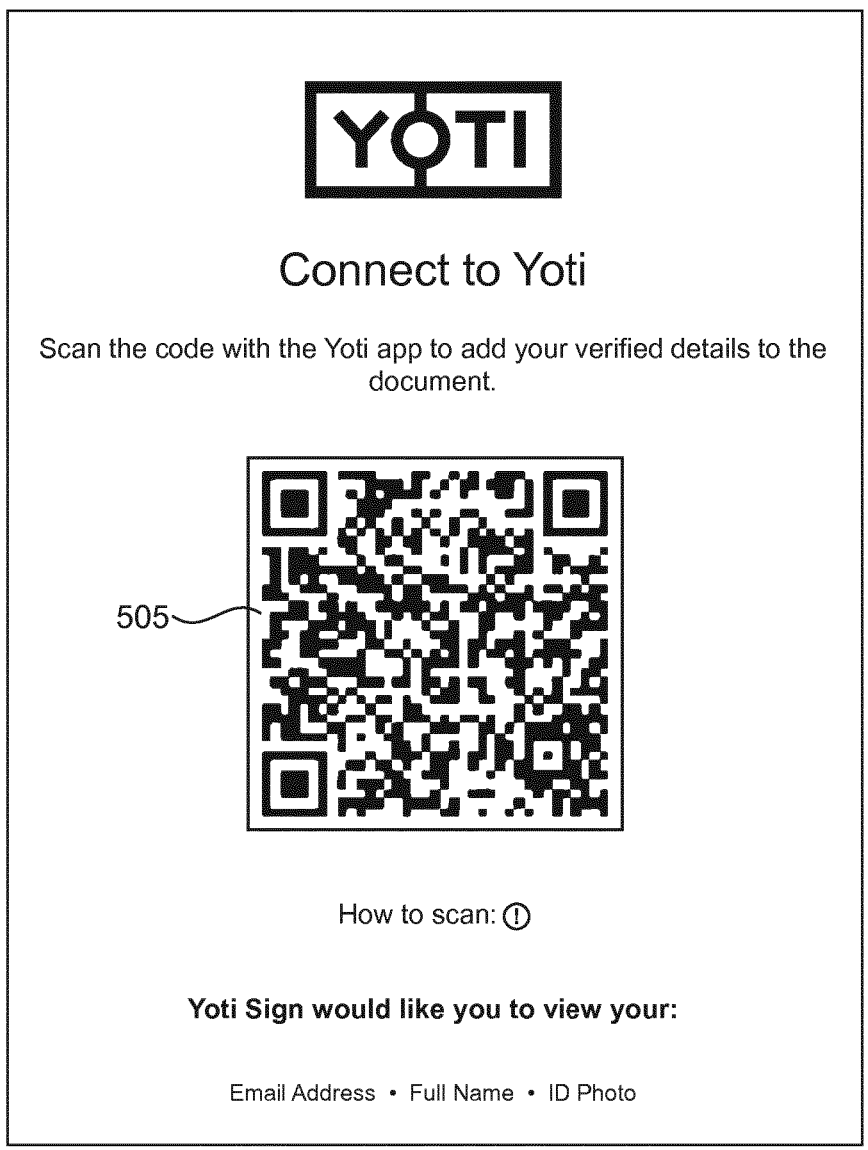

If the signer has a computer device with a camera, he scans the token 505 (e.g. a QR code). This causes a check to be performed by the digital identity platform. An example token is shown in FIG. 5e. The check determines whether or not the signer is authorised to sign the document 503. This ensures that only the intended recipients can sign the document 503. As an option, the recipient may be notified, e.g. by email or text message, when the QR code is scanned.

If the signer is using his own computer device, the token is consumed by the signing service software running on his device.

By scanning the token 505 the signer's attributes 506, which are verified by the digital identity platform, are populated into the previously blank attribute fields 504 on the cover sheet 502. FIG. 5f shows the cover sheet 503 populated with the signer's attributes 506. The date and time at which the cover sheet 502 is populated with the signee's attributes 506 may also be recorded on the cover sheet 502. As another option, the geographical location at which the token was consumed or scanned may also be recorded. As a further option, a signer may be asked for further authentication, such as a 'selfie'.

Figure 5H:
Figure 5I:
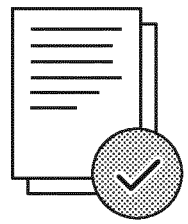

To complete the signing process, the signer clicks on the field of the document where the requester has indicated a signature 507 is required, i.e. a signature marker such as "Sign Here". This is shown in FIGS. 5g to 5i. Clicking on the signature marker 507 signs the document 503 with the signer's signature. The signed document 503 is then sent from the requestor to a process referred to as a signing ceremony at the signing service. This is described later. If multiple recipients were designated by the requester, the signer may be sent a copy of the document 503 once all of the recipients have signed the document 503.

Figure 8:
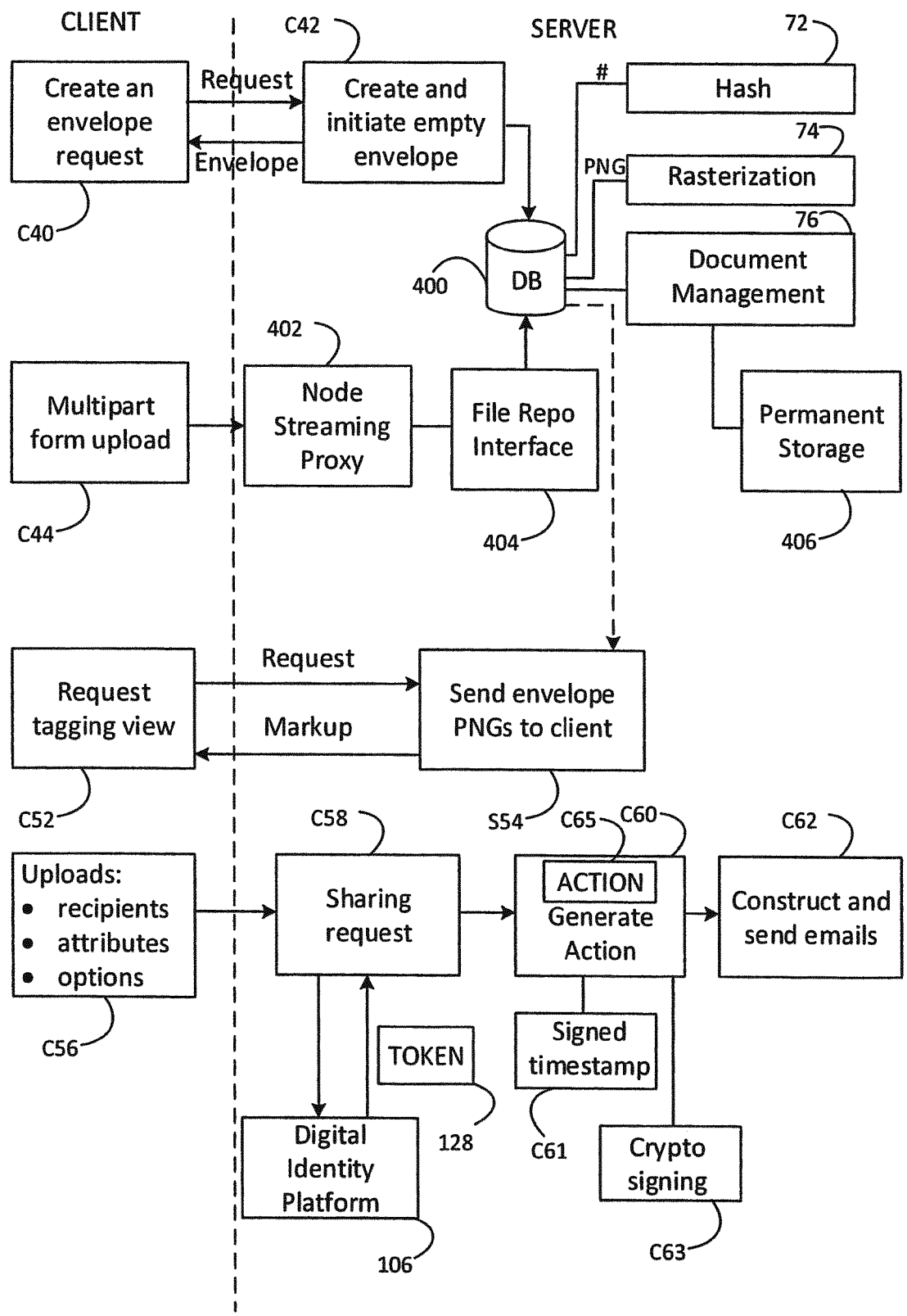
FIG. 8 shows schematically an example of the functionality of the client and server side in the creation of an envelope for signing.

FIG. 8 shows the functionality on the client and server side in the creation of an envelope for signing. An envelope is a conceptual entity that contains a document or group of documents. In some embodiments, it contains information about where the documents are being sent, the status of the documents, and when the documents were created. It will be apparent to the person skilled in the art that this list is not exhaustive, and the envelope may contain other such information.

Figure 7B:
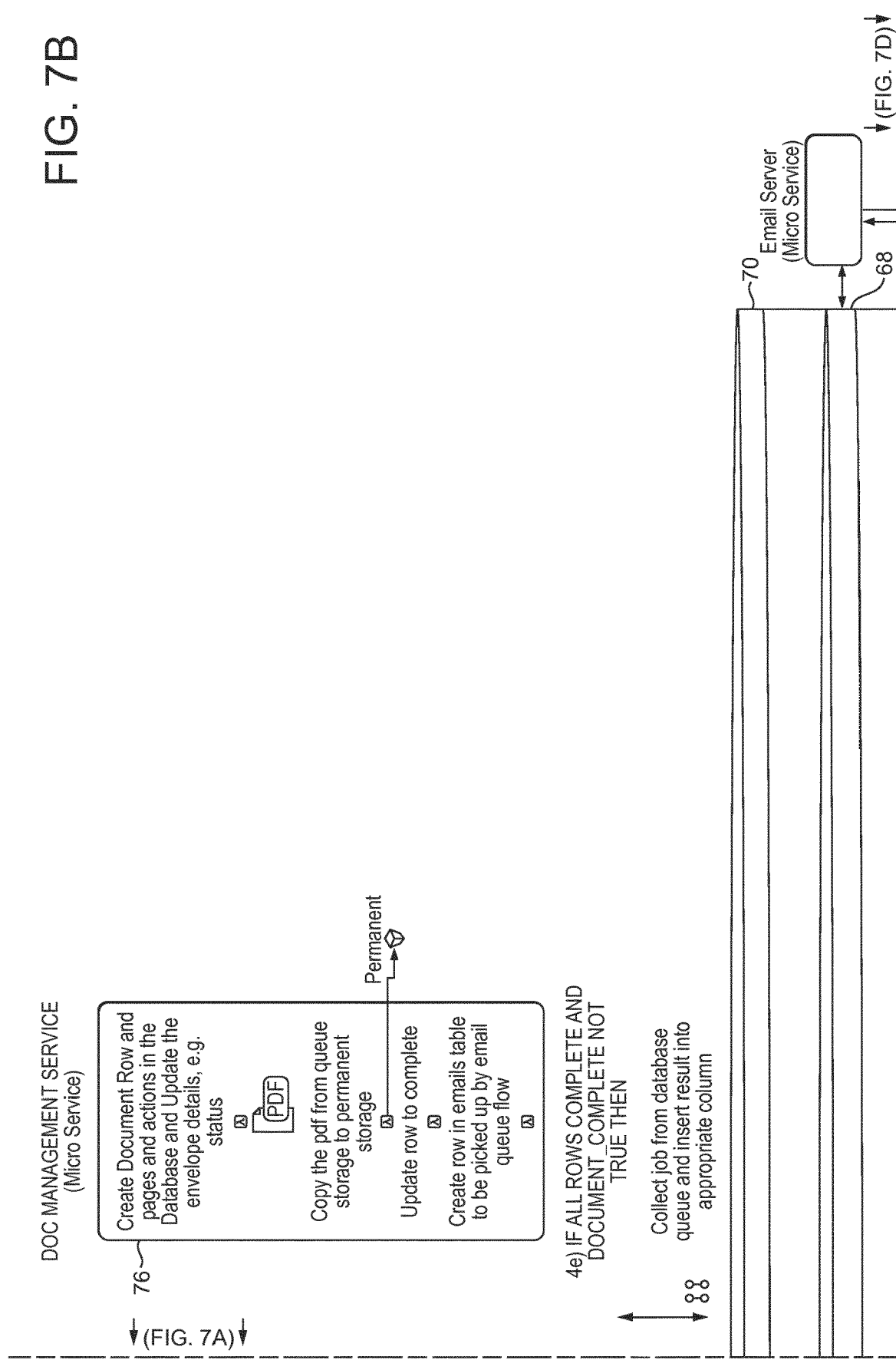
Figure 7C:
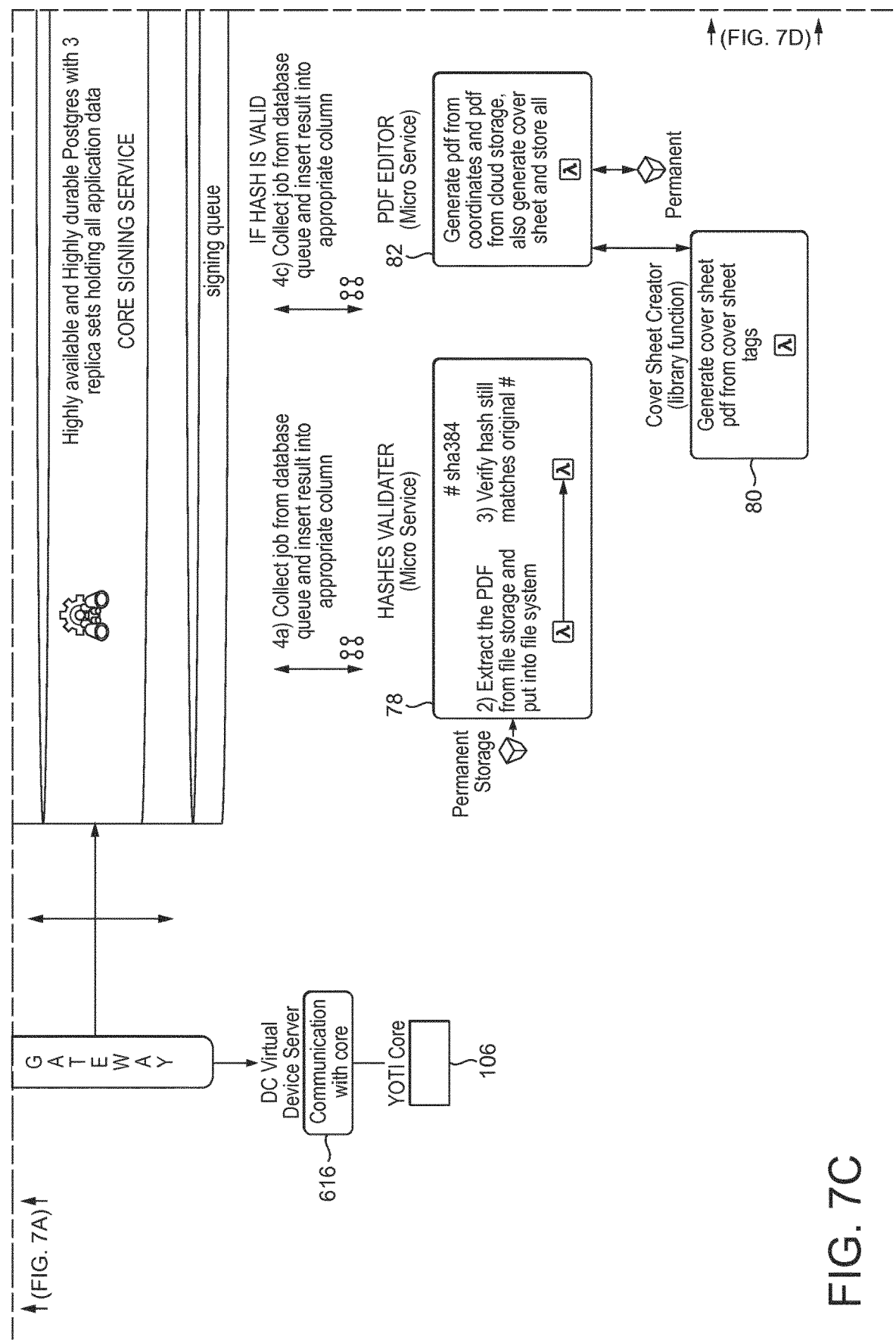
Figure 7D:
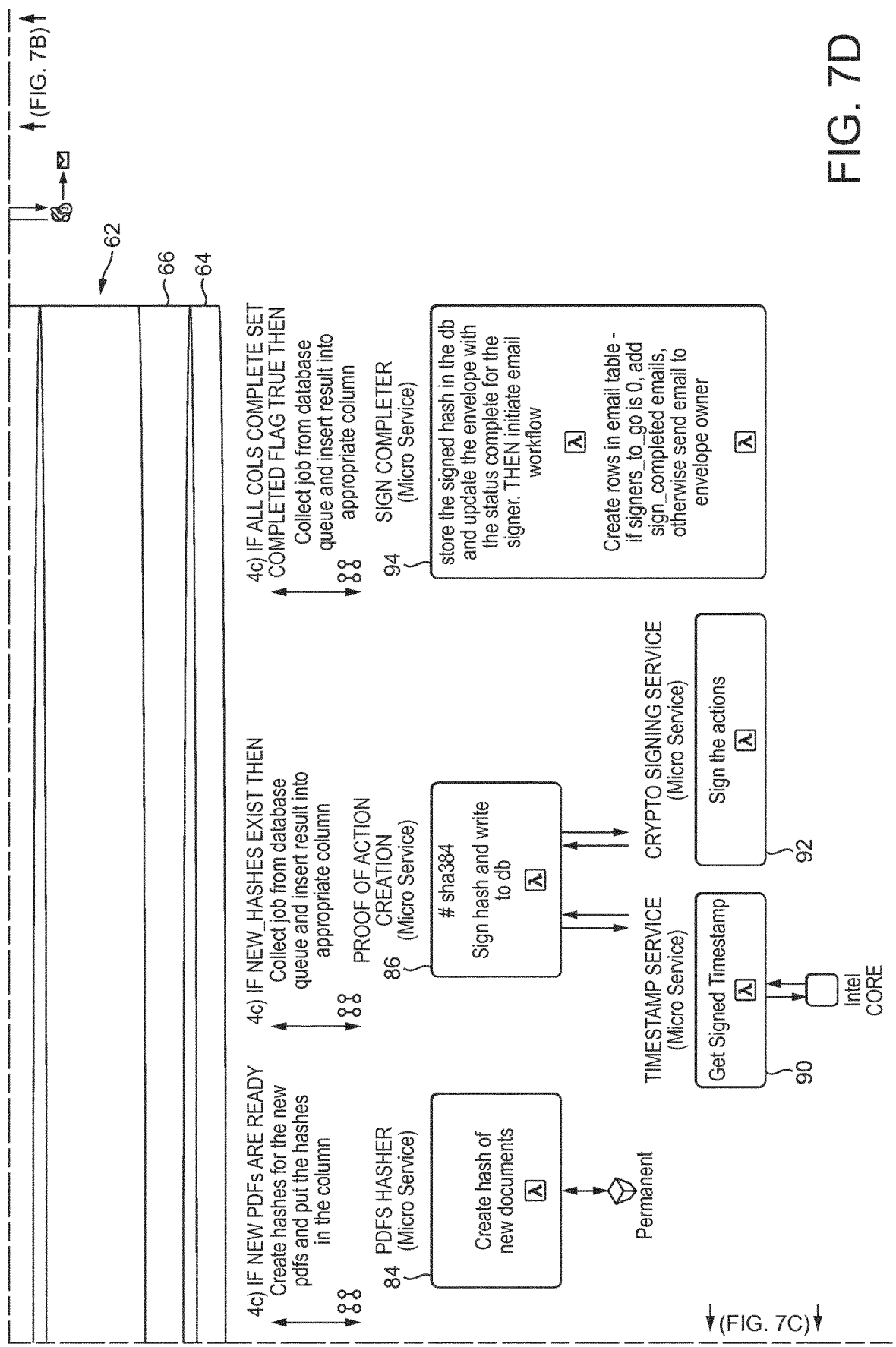

An envelope request is created at step C40. The request is transmitted from the client to the server via the API Gateway 60 (FIG. 7). At step C42 the server creates and initialises an empty envelope. The envelope data is added to a database 400, and returned to the client. Prior to these steps the assumption is made that the user is authenticated and authorised to make the request. An alternative initiating step can be to upload a multipart form presented to the user, containing documents. This is shown at step C44. The content is streamed via a node streaming proxy 402 to the database 400 via an interface module 404 which receives uploads and adds them to the database upload queue. The database 400 operates as a queue where multiple micro services poll specific columns to see if they have values to consume. Each micro service which can access the database to pick up jobs follows the following logical flow. If there is a document in the database, and the column value representing the micro service which is accessing the database is null, and a lock timestamp for the column is null or is now or in the past, then the micro service picks up the job and acts on it. There is a micro service 72 which is a PDF hashing service. It extracts the PDF document from file storage and generates a PDF hash which it writes to the database in the hash column. There is a rasterisation micro service 74 which generates a series of PNG's (Portable Network Graphics) from the PDF (Portable Document Format) and stores them in an object store. A document management micro service 76 creates document rows and pages and sealing actions in the database and updates the envelope details. It is also responsible for copying PDF's from the database queue to permanent storage 406.

Actions are important components of the document software. There are two important types of actions: signing action; and sealing action. Signed action are actions that have been cryptographically signed by the signer with the signer's private key. Sealed actions are actions where the sender has cryptographically signed over to give his approval of the actions being sent. This makes the documents tamper evident in case of changes to the document. These two types of actions will be described in more detail later.

At step C52 the client can request a tagging view. The request is passed to the server which accesses the database 400 as illustrated by the dotted line and retrieves the locations of the PNG's stored in object storage and retrieves envelope data required for tagging. The mark-up is returned for the tagging process to the client. The document tagging process and workflow creation will now be described. At step C56 the client uploads recipients (the intended signers), options and identity attributes which are required from the signer. At Step C58 the server sets up the required sharing for the envelope. To achieve this it accesses the digital identity service to obtain a sharing token described later. The sharing step C58 also saves the recipients of the sharing tokens in the database. At the next step C60 an action is generated from the documents in the envelope and user attributes. An action is generated which is a list of previously added actions with an action name seal. The action name seal is of the type JSON{type, user_ID, env_ID, documents, Yoti—attributes}.

The list of sealed actions is added to the database.

As mentioned, actions form an important part of the signing workflow, and of the electronic signature which is ultimately generated. A sealing action is generated at the point at which the uploaded documents are hashed. The documents are hashed. This could mean that each document generates its own hash, or each document generates multiple hashes. In any event, a hash or hashes of the document are then time stamped using a signed timestamp mechanism. According to this, they are cryptographically signed with a timestamp key provided by the timestamping service. Then, the document hash or hashes and the timestamp signature are signed over by a private key of the requestor. This signed package (with the signed timestamp & signed hashes) is referred to as a sealed action and is stored at the signing service. The signed timestamp set is labelled C61 and the cryptographic signing using the sender's private key is labelled C63. The sealed action itself is labelled C65. Note that it is shown in the generate action module C60 in FIG. 8, but in fact will be stored in a suitable location in the database in association with that request.

The next step at C62 is to create a workflow to construct emails to be sent to recipients with a link pointing to an envelope signing view. In order to achieve this, recipient data is extracted from the database 400, an email is constructed with a link to the signing ceremony and added to the email's table in the database. The email's table in the database constitutes a queue. A mailer service acts on the queue to send emails to the intended recipients. Events are stored in association with the emails so that they can be logged in the database in an events section.

The digital identity platform described herein has the ability to share attributes in sharing exchanges, or sharing transactions. A user can securely share their attributes with other users. The user is able to determine the attribute to share at the time of sharing, that is, there is no requirement to pre-define what must be shared. These properties are used herein in the e-signing service as described in more detail later. As described, a requestor can define what attributes are to be included in the identity sheet which will form part of the signature. The signer should of preference provide these attributes at the time of signing, as they will form part of the signature. This allows the identity of the signer to be intimately connected, within the signature, to the document that is signed.

FIG. 6 illustrates how attributes may be shared using the digital identity platform. The requestor issues a sharing request using his device 102A. This sharing request forms part of the procedure for uploading a document to be signed. The policy in the sharing request may be specified by the requestor. The sharing request includes the policy, attribute identifiers, the wrapped key 118, the credential 120, and optionally other items such as requested authorisation list, the expiry time or time to live (TTL) and a flag indicating whether it is a single use token or a static token. Note that the credential 120 is associated with a virtual interface 616 of the signing service 600. In the case of the electronic signing discussed herein, the token is a single use token for the signing of that document. Note that different embodiments might utilise a static credential in a web authentication flow described in U.S. Ser. No. 14/622,740. When sharing is initiated, the sharing policy is encrypted and published to the digital identity platform server 106. The server 106 generates a sharing token 128 which comprises a policy URI generated from the sharing policy 123, and a cryptographic key 125. A list of items of a sharing policy are exemplified in one or more of the earlier filed applications of the applicant referenced above, herein incorporated by reference. The sharing token 128 is transferred to the signer as part of the signing ceremony. On consuming this (by scanning or in any other way), the signer can retrieve the sharing policy requested within it and generate the compliant policy in response. To activate this, the signer's device queues the identity platform 106 using the token, which retrieves the attributes defined in the policy. The compliant policy is generated with a value for each requested attribute. If the policy requires further authentication, such as a selfie, the signer is prompted. If the identity platform can generate attributes to match the attributes requested in the policy sharing within token, then the signing proceeds and there has been a successful completion of the sharing request. At this point, receipts may be generated containing URI's to profiles of both the requestor and signer in the identity store. These receipts could in principle also be used as part of the signature for the documents. Such receipts are discussed in more detail in the earlier applications already mentioned, the contents of which are herein incorporated by reference.

In the present description there is reference to actions which occur in the signing service. An action as defined herein as an action that has taken place using the signing service which is significant enough to time stamp and cryptographically sign with the user's private key. This includes for example the creation of an envelope, the signing of an envelope or the editing of an envelope. Actions are used to produce a 'proof'. This proof linked together with other proof of actions can be used to categorically prove that an action took place at a point in time, and be uniquely linked to the originator of the action consistently. The sealing action C65 on document uploaded was described earlier. Other signing actions are described later.

FIG. 7 is a schematic diagram of architectural components of an electronic signing system. FIG. 7 illustrates an API (Application Programming Interface) gateway 60. The gateway can receive documents uploaded to be signed by a requestor, or signed documents by a signer, according to the flows described herein. The API gateway 60 has access to the digital identity platform 106 via a virtual interface 616, which has its own credentials for accessing the platform. A core signing service is denoted by reference numeral 62. This comprises a signing queue 64 of documents awaiting signature. The signing platform provides a plurality of micro services for executing the flow to send a document to be signed. These components are each illustrated as separate functional modules in FIG. 7. It will readily be appreciated, however, that the functions delivered by these modules can be delivered in any suitable way. For example, they could be delivered in one centralised service, and may be delivered in different sequences. The functions may be delivered by suitably programmed computers, or as micro services spun up as required. Thus it will be understood that the functional description here is given for ease of clarity and does not imply any particular implementation.

Reference numeral 66 denotes an object store for storing all application data. References to the object store refer to the storage of objects in this database. Reference numeral 68 denotes an email queue.

Reference numeral 70 denotes an upload queue for documents to be signed. The upload queue is associated with a set of functional modules to prepare the documents for signing. A PDF hashing module 72 creates a hash of the document and stores the hash in the object store 66. A rasterisation module 74 converts the documents from PDF (Portable Document Format) into PNG (Portable Network Graphics) and stores the PNGs in the object store. A document management service 76 manages documents within a database. It creates document rows in the database and updates envelope details, e.g. status. It is also responsible for placing PDFs in permanent storage.

An example action written in JSON is shown below. In this case it is a SIGN (signing) action. The action has a type field, which in this case is populated by "SIGN". The action has a documents field which in this case is populated by a document identifier, a version identifier, the hash and information about the hash type. The hash is the hash that was generated by the hashing module 72. There is a field for identity attributes (labelled Yoti_attributes). These attributes define the attributes that are required for the signature, in this case a selfie, gender and nationality. Identity attributes are also tied in to a receipt identifier and a policy authorisation, as described above with reference to sharing. The action comprises a user identifier field which contains a user ID, and envelope identity field which includes an envelope identifier and a metadata field.

An action written in JSON looks like.

```
{
"type":"SIGN",
```

An action can be signed by hashing it and encrypting it using the private key of the requestor or signer. The SIGN action is signed using the private key of the signer.

It will be appreciated by a person skilled in the art that other action types may be written in a similar manner. For example, other action types may include: "SEAL" (sealing actions); "EDIT" (edit actions); "RESCIND" (rescinding actions); and "TERMINATE" (terminating actions).

A timestamp written in JSON looks like:

```
"documents":[{"id":document_id,"version":"version_id", "hash":"asomomedoahHASH",
"hash_type":"SHA384",
"encoding":"base64"}],
"yoti_attributes":{attributes:["selfie","gender","nationality"],receipt_id:"<receipt_id>",
policyAuth:{this:is,json: }},
"user_id":"user_id",
"envelope_id":"envelop_id"
"metadata":[,{"key":"ip_address","value":"12.122.122.1"}]
}
{
signature: {
algorithm: RSA_PSS_SHA256 | RSA_PSS_SHA384 | RSA_PSS_SHA512,
value: <signedHash>,
},
```

Any suitable timestamping protocol may be utilised. The value <signedHash> is the signed hash of the SIGN action defined above.

78 denotes a hashes validator function. This function extracts the PDF from the permanent file store and places it into the file system. It creates a hash of the PDF document and verifies that it still matches the original. Reference numeral 80 denotes a cover sheet creator function. This generates the cover sheet (the identity sheet) from cover sheet tags which were entered when the signer populated the identity sheet. Reference numeral 82 denotes a PDF editor. The PDF editor is also responsible for generating the cover sheet and storing the cover sheet with the PDF.

The original PDF is stored in object storage, and the tags and coordinates are captured from the client. These are used to generate a new PDF representing the document in its signed state. This document is the latest document and this is hashed and put into the 'sign' action. The cover sheet creator is a library which creates empty cover sheets which are filled in by the PDF editor.

A PDF hasher module 84 creates a hash from the new documents, which includes the cover sheet. A proof of action creation module 86 checks for new hashes, signs them and writes them to the database. Signing is accomplished by retrieving a signed timestamp from the timestamp service 90 and then signing the hash using the PKI server. The sign completer function 94 stores the signed hash in the database and updates the envelope with the status. An email workflow is then initiated to send emails to recipients. The emails contain a link pointing to the envelope signing view so that the envelope may be viewed by the recipient of the email (the requestor).

The sign completer only sends out completion emails. Given the signer and sender copies of the signed document, filled in cover sheet and the signature cryptographically link the documents. The signature may be in XML format. Note that for multiple signers there may be a sealed cover sheet for each signer.

Figure 10:
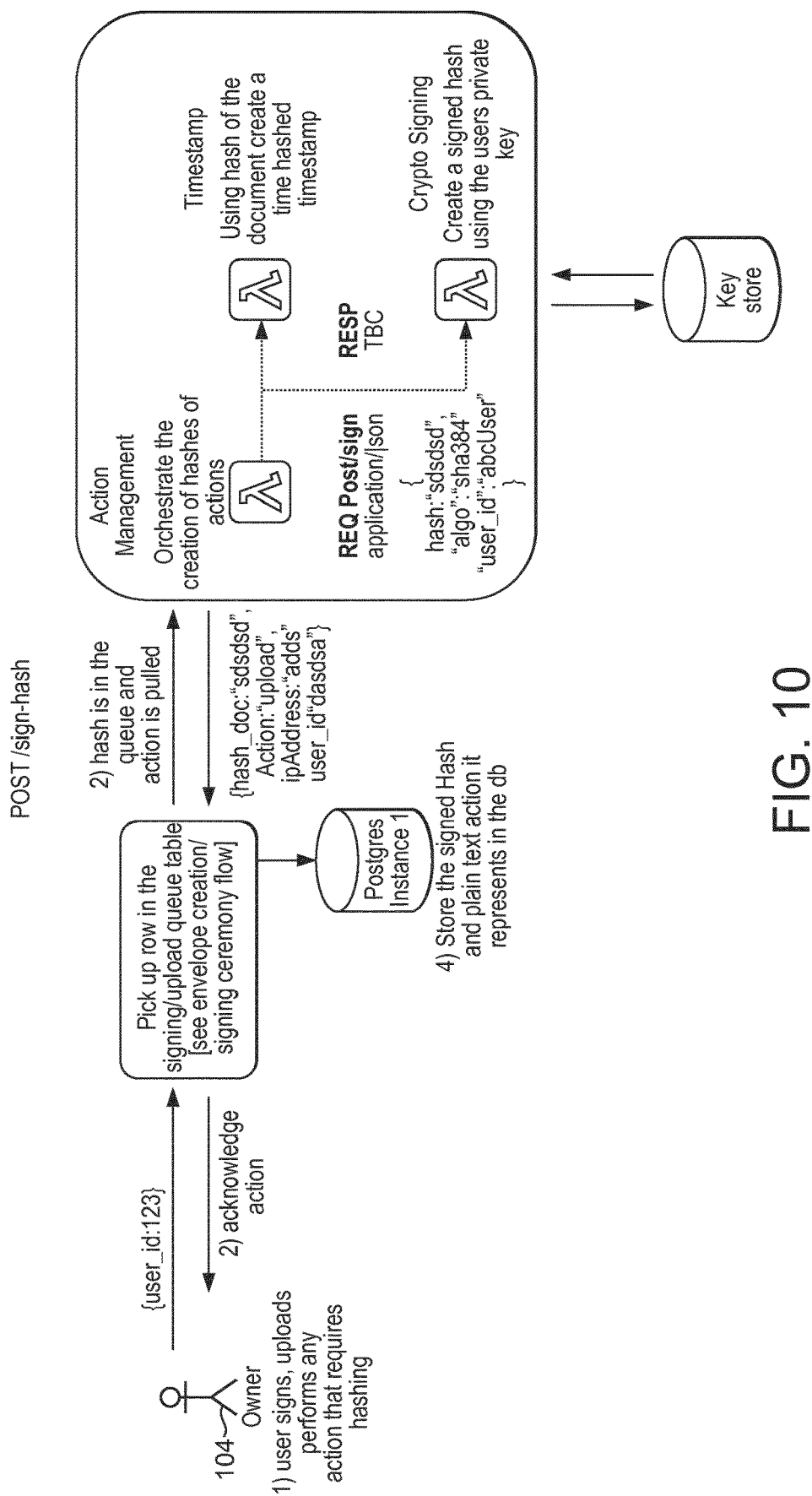
FIG. 10 shows schematically an example diagram of the sequence of generating a signed hash for a user.

FIG. 10 is a schematic diagram of the sequence of generating a signed hash for a user. The user 104 signs the document (for example by selecting the sign here or by entering his signature) and thus creates a signing action as described earlier. This includes, for example, population of the identity sheet as mentioned above. The user identifier is used to access a row in the signing/upload queue table. The hash for the document associated with that user is in the queue and the sign request is pulled from the queue. The action management module orchestrates the creation of hashes of actions. It uses a hash of the documents to create a time hash timestamp and creates a signed hash using the user's private key. It accesses the key store to obtain the user's private key associated with the user identifier. The signed hash and the plaintext that it represents (for example the identity sheet) is returned and stored at the signing service. The signing action is then acknowledged back to the signer 104.

FIG. 10A is a schematic diagram of the components of an XML digital signature which is used to sign the document and which can be conveyed with the document. The signature follows a XML-XADES format, which comprises signed information, signing properties and a body. The signed information is a hash of the signing properties and a hash of the body. These two hashes are hashed together and then signed using the signer's key. The body of the signature comprises a cryptographically signed set of hashes which are generated during the signing ceremony, or at the upload stage.

The body comprises a hash of the sealed action. The body further comprises a hash of the latest documents (the modified documents prior to signature). The body further comprises a hash of the cover sheet tags and the latest version of the document. Note that it is in principle not necessary to include the latest version of the documents twice, this is done for additional protection. First, this third hash could be of the cover sheet tags only. Note that the cover sheet tags (and the latest documents if provided) are hashed and then time stamped with an intention time stamp. The timestamp is carried out using a timestamping service as for the sealing action. The intention timestamp denotes the time at which a signer decides to sign (by generating the signature or clicking the button).

Note that the sealed action which is generated on upload is the same for each signer in the case of multiple signers. It would include a hash of each document to be signed. At this stage it does not include any identifying information and therefore has nothing in it to uniquely identifying each signer. It has, as described, been signed by the private key of the sender.

While one particular embodiment has been described, it will be appreciated that while a particular architectural embodiment and flow of steps has been described, there may be many different variations. Some of these variations are discussed below, but they are not limiting and other variations may be possible. A document may be hashed when it is uploaded for signing by a micro service attached to the database when the file is uploaded. The generation of a time hashed timestamp and the signed hash may be actioned independently or simultaneously. As a further alternative they could be carried out in sequence, first going through a time stamping process and then a hash signing process. FIGS. 11A, 11B, 11C and 11D illustrate different possible sequences.

Figure 11A:
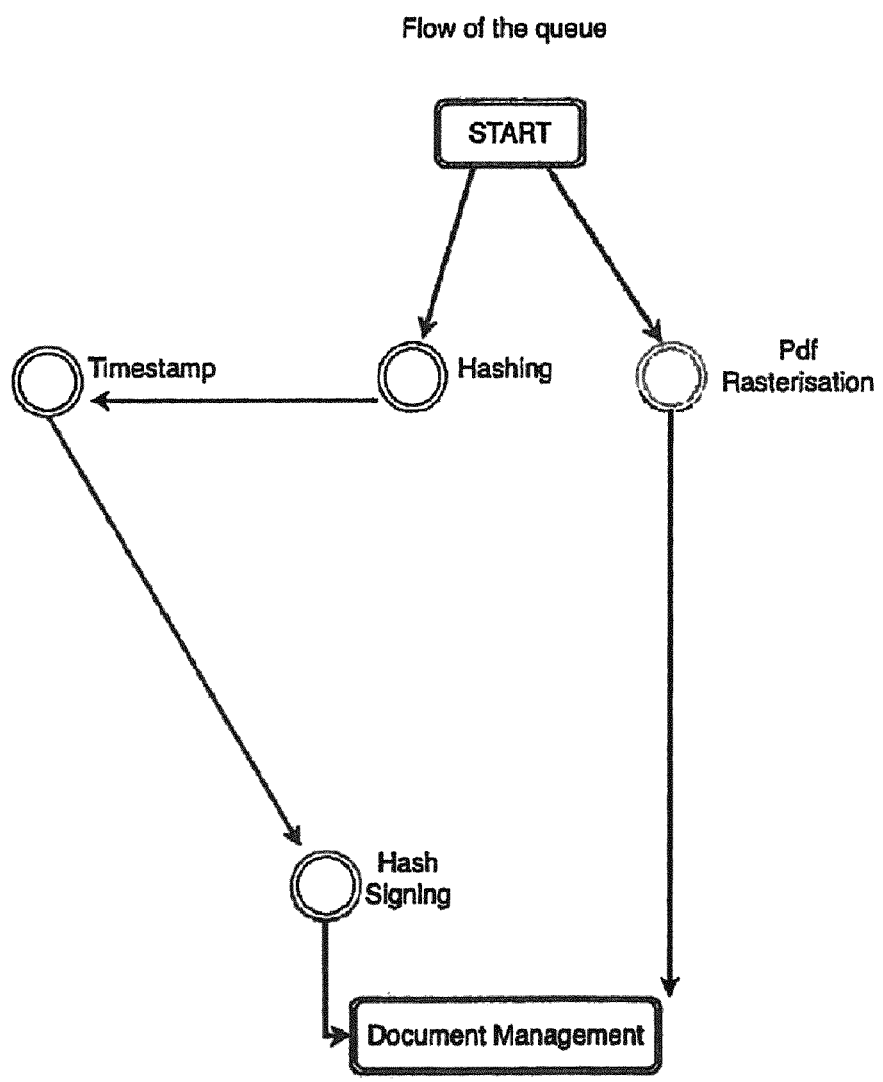
FIG. 11A to 11D show different workflows for signing.

FIG. 11A shows a signature being generated by hashing the latest document, then applying a timestamp, then taking a hash over the hash documents as timestamps and cryptographically signing that.

Figure 11B:
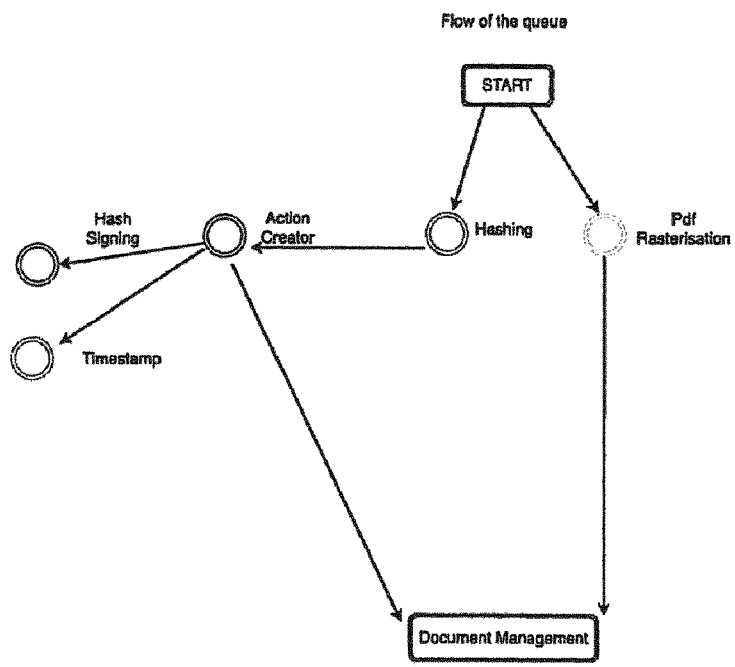

FIG. 11B shows an alternative flow where the step of hashing is followed by an action creator, as described with reference to FIG. 8. The action creator takes care of the hash signing and the time stamping.

Figure 11C:
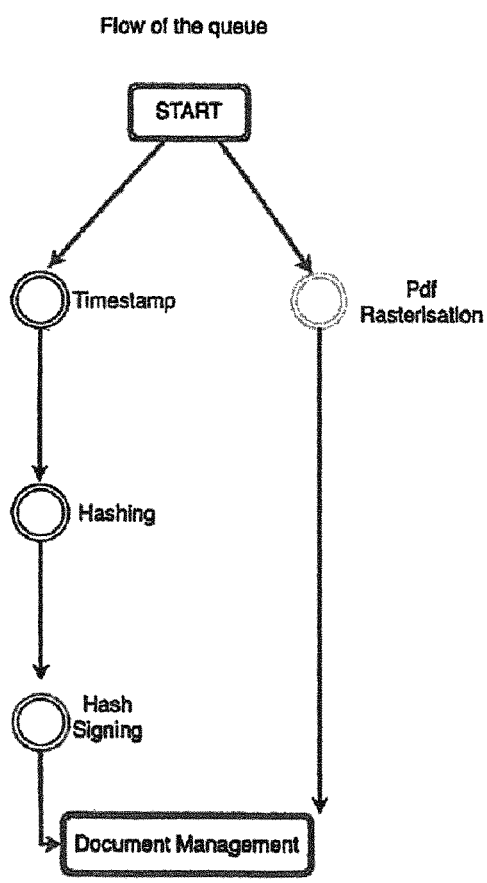

FIG. 11C denotes an alternative flow again in which the timestamp signature is generated first, followed by hashing and then followed by the cryptographic signing of the hashes.

Figure 11D:
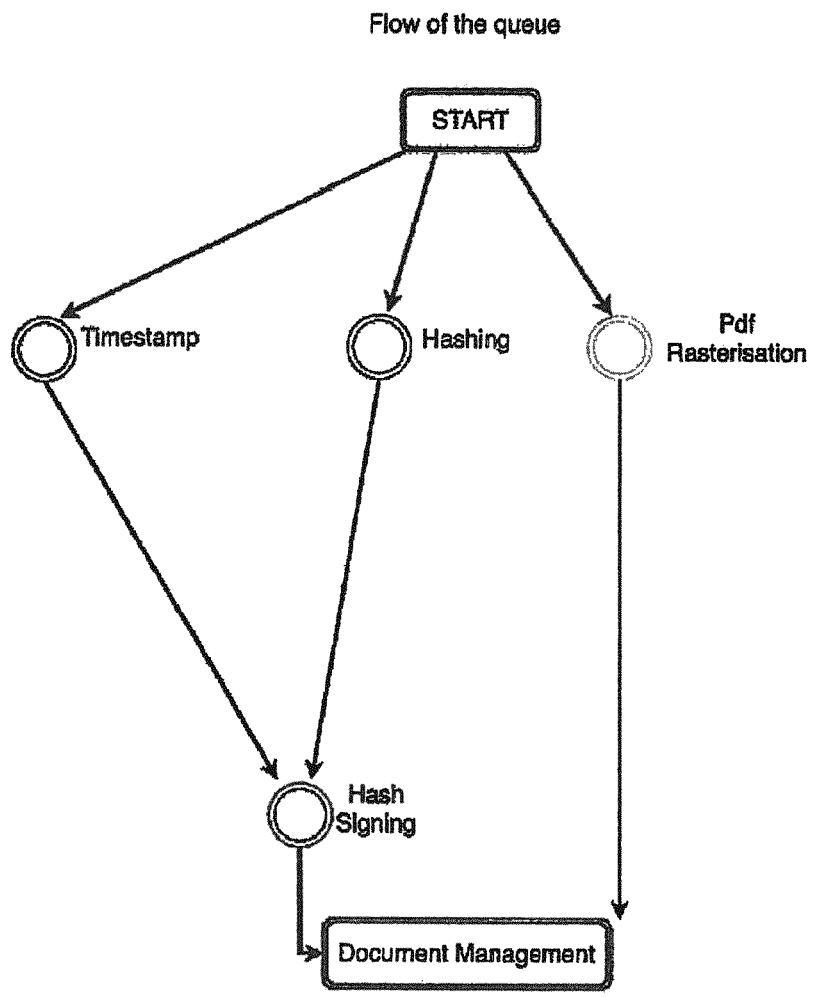

FIG. 11D denotes an alternative flow in which the hashing and timestamping are carried out separately and then feed into a cryptographic signing of the hashes.

The invention claimed is:

1. A method of electronically signing content, the method comprising:
   receiving, from a signing service, an electronic message comprising content to be signed and an identifier of at least one identity attribute;
   presenting at a signing device associated with a signer (i) the content to be signed and (ii) an attribute sharing item which, when accessed, causes the at least one identity attribute to be provided;
   detecting that the signer has accessed the attribute sharing item, and causing the at least one identity attribute which uniquely identify the signer to be provided to the signing device for presenting with the content to be signed;
   detecting that the signer has initiated a signing action at the signing device; and
   transmitting the signing action and the at least one identity attribute to the signing service which is configured to create an electronic signature including encrypting the content to be signed and the at least one identity attribute.

2. The method of claim 1 wherein attribute sharing item is a graphical item accessible by the signing device.

3. The method of claim 2 wherein the graphical item comprises a token containing attribute identifiers enabling the at least one identity attribute to be accessed from an identity platform which holds a digital identity for the signer.

4. The method of claim 1 wherein the attribute sharing item comprises a link and the method comprises presenting the link to the signer at the signing device, the link being accessible by the signer to cause an identity sheet to be presented to the signer for populating with the at least one identity attributes.

5. The method of claim 1 comprising causing the signer to provide a biometric identifier and transmitting the biometric identifier with the signing action to the signing service.

6. The method of claim 1, wherein the electronic signature comprises an encrypted version of a hash of the content to be signed and the at least one identity attribute.

7. The method of claim 1 further comprising receiving a signed version of the content, the signed version including the electronic signature created using a private key accessed from a digital identity of the signer.

8. A system comprising:
   a non-transitory data store storing computer-executable instructions; and
   one or more processors configured to execute the computer-executable instructions, wherein execution of the computer-executable instructions causes the system to:
      receive, from a signing service, an electronic message comprising content to be signed and an identifier of at least one identity attribute;
      present at a signing device associated with a signer (i) the content to be signed and (ii) an attribute sharing item which, when accessed, causes the at least one identity attribute to be provided;
      detect that the signer has accessed the attribute sharing item, and causing the at least one identity attribute which uniquely identify the signer to be provided to the signing device for presenting with the content to be signed;
      detect that the signer has initiated a signing action at the signing device; and
      transmit the signing action and the at least one identity attribute to the signing service which is configured to create an electronic signature including encrypting the content to be signed and the at least one identity attribute.

9. The system of claim 8, wherein attribute sharing item is a graphical item accessible by the signing device.

10. The system of claim 9, wherein the graphical item comprises a token containing attribute identifiers enabling the at least one identity attribute to be accessed from an identity platform which holds a digital identity for the signer.

11. The system of claim 8, wherein the attribute sharing item comprises a link, and wherein execution of the computer-executable instructions further causes the system to present the link to the signer at the signing device, the link being accessible by the signer to cause an identity sheet to be presented to the signer for populating with the at least one identity attributes.

12. The system of claim 8, wherein execution of the computer-executable instructions further causes the system to obtain from the signer a biometric identifier and to transmit the biometric identifier with the signing action to the signing service.

13. The system of claim 8, wherein the electronic signature comprises an encrypted version of a hash of the content to be signed and the at least one identity attribute.

14. The system of claim 8, wherein execution of the computer-executable instructions further causes the system to receive a signed version of the content, the signed version including the electronic signature created using a private key accessed from a digital identity of the signer.

15. One or more non-transitory computer-readable media comprising computer-executable instructions, that, when executed by a computing system comprising one or more processors, cause the computing system to:
   receive, from a signing service, an electronic message comprising content to be signed and an identifier of at least one identity attribute;
   present at a signing device associated with a signer (i) the content to be signed and (ii) an attribute sharing item which, when accessed, causes the at least one identity attribute to be provided;
   detect that the signer has accessed the attribute sharing item, and causing the at least one identity attribute which uniquely identify the signer to be provided to the signing device for presenting with the content to be signed;
   detect that the signer has initiated a signing action at the signing device; and
   transmit the signing action and the at least one identity attribute to the signing service which is configured to create an electronic signature including encrypting the content to be signed and the at least one identity attribute.

16. The one or more non-transitory computer-readable media of claim 15, wherein attribute sharing item is a graphical item accessible by the signing device.

17. The one or more non-transitory computer-readable media of claim 16, wherein the graphical item comprises a token containing attribute identifiers enabling the at least one identity attribute to be accessed from an identity platform which holds a digital identity for the signer.

18. The one or more non-transitory computer-readable media of claim 15, wherein the attribute sharing item comprises a link, and wherein execution of the computer-executable instructions further causes the system to present the link to the signer at the signing device, the link being accessible by the signer to cause an identity sheet to be presented to the signer for populating with the at least one identity attributes.

19. The one or more non-transitory computer-readable media of claim 15, wherein execution of the computer-executable instructions further causes the system to obtain from the signer a biometric identifier and to transmit the biometric identifier with the signing action to the signing service.

20. The one or more non-transitory computer-readable media of claim 15, wherein the electronic signature comprises an encrypted version of a hash of the content to be signed and the at least one identity attribute.

* * * * *

UNITED STATES PATENT AND TRADEMARK OFFICE
CERTIFICATE OF CORRECTION

PATENT NO. : 11,509,483 B2  
APPLICATION NO. : 17/058539  
DATED : November 22, 2022  
INVENTOR(S) : Alttaf Hussain Page 1 of 2

It is certified that error appears in the above-identified patent and that said Letters Patent is hereby corrected as shown below:

In the Specification

Column 4, Line 51, delete "keys." and insert -- keys, --.

Column 13, Line 20, delete "like." and insert -- like: --.

Column 13, Line 24 (approx.), below ""type":"SIGN"," insert
-- "documents":[{"id":document_id,"version":"version_id", "hash":"asomomedoahHASH",
"hash_type":"SHA384",
"encoding":"base64"}],
"yoti_attributes":{attributes:["selfie","gender","nationality"],receipt_id:"<receipt_id>",
policyAuth:{this:is,json: }},
"user_id":"user_id",
"envelope_id":"envelop_id"
"metadata":[,{"key":"ip_address","value":"12.122.122.1"}]
}
{
signature: {
algorithm: RSA_PSS_SHA256 I RSA_PSS_SHA384 I RSA_PSS_SHA512,
value: <signedHash>,
}, --.

Column 13-14, Line 36-47 (approx.), delete "documents":[{"id":document_id,"version":"version_id",
"hash":"asomomedoahHASH",
"hash_type":"SHA384",
"encoding":"base64"}],
"yoti_attributes":{attributes:["selfie","gender","nationality"],receipt_id:"<receipt_id>",
policyAuth:{this:is,json: }},
"user_id":"user_id",
"envelope_id":"envelop_id"

Signed and Sealed this  
Twenty-fifth Day of April, 2023

Katherine Kelly Vidal  
*Director of the United States Patent and Trademark Office*

"metadata":[,{"key":"ip_address","value":"12.122.122.1"}]
}
{
signature: {
algorithm: RSA_PSS_SHA256 I RSA_PSS_SHA384 I RSA_PSS_SHA512,
value: <signedHash>,
}," and insert -- certificates: [base64 encoded certificate, …], // see description below
timestamp: "2017-04-04T23:42:53Z", //UTC timestamp in RFC3339
} --.